US011315315B2

(12) United States Patent
Kim et al.

(10) Patent No.: US 11,315,315 B2
(45) Date of Patent: Apr. 26, 2022

(54) MODIFYING THREE-DIMENSIONAL REPRESENTATIONS USING DIGITAL BRUSH TOOLS

(71) Applicant: Adobe Inc., San Jose, CA (US)

(72) Inventors: Byungmoon Kim, Sunnyvale, CA (US); Yeojin Kim, Seoul (KR); Daichi Ito, Los Gatos, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/549,188

(22) Filed: Aug. 23, 2019

(65) Prior Publication Data
US 2021/0056752 A1    Feb. 25, 2021

(51) Int. Cl.
| G06T 17/00 | (2006.01) |
| G06T 19/20 | (2011.01) |
| G06T 15/20 | (2011.01) |
| G06T 15/02 | (2011.01) |

(52) U.S. Cl.
CPC ............ *G06T 17/005* (2013.01); *G06T 15/02* (2013.01); *G06T 15/205* (2013.01); *G06T 19/20* (2013.01); *G06T 2219/20* (2013.01)

(58) Field of Classification Search
None
See application file for complete search history.

(56) References Cited

U.S. PATENT DOCUMENTS

| 4,796,020 A * | 1/1989 | Budrikis ............. G06F 3/04845 345/418 |
| 6,016,150 A * | 1/2000 | Lengyel ................ G06T 11/001 345/426 |
| 6,456,295 B1 * | 9/2002 | Schiller ................ G06T 11/001 345/616 |
| 6,844,882 B1 * | 1/2005 | Clauson .............. G09G 3/2051 345/596 |
| 6,898,692 B1 * | 5/2005 | Cameron ............. G06T 15/405 710/52 |

(Continued)

OTHER PUBLICATIONS

A. Andre, S. Saito, "Single-view Sketch Based Modeling," In Proceedings of the Eighth Eurographics Symposium on Sketch-Based Interfaces and Modeling (SBIM'11), pp. 133-140, 2011.

(Continued)

*Primary Examiner* — Anh-Tuan V Nguyen
(74) *Attorney, Agent, or Firm* — Keller Preece PLLC

(57) ABSTRACT

Systems, methods, and non-transitory computer-readable media are disclosed for modifying voxel-based 3D representations using 3D digital brush tools and/or resolution filters. For example, the disclosed systems can utilize 3D digital brush tools (e.g., a digital blur brush tool, a digital smudge brush tool, and/or a digital melt brush tool) to identify and modify one or more voxels within a 3D representation using multiple buffers of visual properties. Additionally, the disclosed systems can modify one or more voxels within a 3D representation by rendering the one or more voxels at varying levels of detail using an octree (e.g., a mosaic filter tool). In particular, the disclosed systems can identify one or more voxels within an octree that are smaller than a target voxel size. Moreover, the disclosed systems can combine the identified one or more voxels within the octree to render the 3D representation at varying levels of detail.

20 Claims, 18 Drawing Sheets

(56) References Cited

U.S. PATENT DOCUMENTS

| | | | | |
|---|---|---|---|---|
| 2002/0075283 A1* | 6/2002 | Payne | G06T 17/00 | 345/643 |
| 2002/0118209 A1* | 8/2002 | Hylen | G03B 1/48 | 345/582 |
| 2007/0268302 A1* | 11/2007 | Hsu | G06T 11/001 | 345/589 |
| 2008/0069444 A1* | 3/2008 | Wilensky | G06K 9/38 | 382/173 |
| 2008/0094411 A1* | 4/2008 | Parenteau | G09G 5/393 | 345/592 |
| 2010/0115356 A1* | 5/2010 | Chen | H04N 1/4052 | 714/746 |
| 2010/0207957 A1* | 8/2010 | Taneja | G09G 5/397 | 345/592 |
| 2012/0176364 A1* | 7/2012 | Schardt | G06T 15/405 | 345/419 |
| 2013/0120436 A1* | 5/2013 | Krishnaswamy | G06T 11/40 | 345/594 |
| 2013/0257853 A1* | 10/2013 | Schmidt | G06T 17/20 | 345/419 |
| 2014/0292754 A1* | 10/2014 | Pennington | G06F 3/04815 | 345/422 |
| 2015/0170401 A1* | 6/2015 | Major | G06T 17/00 | 345/424 |
| 2015/0193950 A1* | 7/2015 | Smolic | G06T 11/001 | 345/589 |
| 2016/0148395 A1* | 5/2016 | Kim | G06T 11/40 | 345/589 |
| 2018/0114368 A1* | 4/2018 | Marketsmueller | G06T 17/10 | |
| 2020/0211275 A1* | 7/2020 | Eshima | G06T 7/55 | |

OTHER PUBLICATIONS

Adobe Systems Incorporated, "Adobe photoshop user guide," http://www.photoshop.com/, 2016.

A. D. Gregory, S. A. Ehmann, M. C. Lin, "intouch: Interactive multi-resolution modeling and 3d painting with a haptic interface," Proceedings IEEE Virtual Reality 2000, pp. 45-52, 2000.

A. E. Lefohn, S. Sengupta, J. Kniss, R. Strzodka, J. D. Owens, "Glift: Generic, efficient, random-access GPU data structures," ACM Transactions on Graphics (TOG), vol. 25, No. 1, pp. 60-99, 2006.

A. Hornung, K. M. Wurm, M. Bennewitz, C. Stachniss, W. Burgard, "Octomap: An efficient probabilistic 3d mapping framework based on octrees," Autonomous Robots, vol. 34, No. 3, pp. 189-206, 2013.

A. Shtof, A. Agathos, Y. Gingold, A. Shamir, D. Cohen-Or, "Geosemantic Snapping for Sketch-Based Modeling," Computer Graphics Forum, vol. 32, No. 2pt2, pp. 245-253, 2013.

B. Adams, M. Wicke, P. Dutré, M. H. Gross, M. Pauly, M. Teschner, "Interactive 3D Painting on Point-Sampled Objects," Symposium on Point Based Graphics(SPBG), pp. 57-66, 2004.

B. Dado, T. R. Kol, P. Bauszat, J.-M. Thiery, E. Eisemann, "Geometry and attribute compression for voxel scenes," Computer Graphics Forum, vol. 35, No. 2, pp. 397-407, 2016.

B. Guenter, M. Finch, S. Drucker, D. Tan, J. Snyder, "Foveated 3D graphics," ACM Transactions on Graphics (TOG), vol. 31, No. 6, pp. 164, 2012.

B. Kim, P. Tsiotras, J. Hong, O. Song, "Interpolation and parallel adjustment of center-sampled trees with new balancing constraints," The Visual Computer, vol. 31, No. 10, pp. 1351-1363, 2015.

B. Lévy, S. Petitjean, N. Ray, J. Maillot, "Least squares conformal maps for automatic texture atlas generation," ACM transactions on graphics (TOG), vol. 21, pp. 362-371, 2002.

B. Johanna, H. Markus, P. Hanspeter, "State-of-the-art GPU-based large-scale volume visualization," Computer Graphics Forum, vol. 34, No. 8, pp. 13-37, 2015.

C. Crassin, F. Neyret, S. Lefebvre, E. Eisemann, "Gigavoxels: Ray-guided streaming for efficient and detailed voxel rendering," ACM SIGGRAPH Symposium on Interactive 3D Graphics and Games (I3D), 2009.

C. Crassin, F. Neyret, M. Sainz, S. Green, E. Eisemann, "Interactive indirect illumination using voxel cone tracing," Computer Graphics Forum (Proceedings of Pacific Graphics 2011), vol. 30, No. 7, 2011.

C. Crassin, S. Green, "Octree-based sparse voxelization using the GPU hardware rasterizer," OpenGL Insights, pp. 303-318, 2012.

Chen Wei, "Volumetric cloud generation using a Chinese brush calligraphy style," Ph.D. Dissertation, University of Cape Town, 2014.

C. J. Curtis, S. E. Anderson, J. E. Seims, K. W. Fleischer, D. H. Salesin, "Computer-generated watercolor," Proceedings of the 24th annual conference on Computer graphics and interactive techniques, pp. 421-430, 1997.

C. Regan, "An investigation into nausea and other side-effects of head-coupled immersive virtual reality" Virtual Reality, vol. 1, No. 1, pp. 17-31, 1995.

D. Benson, J. Davis, "Octree textures," ACM Transactions on Graphics (TOG), vol. 21, No. 3, pp. 785-790, 2002.

D. Coeurjolly, P. Gueth, J. Lachaud, "Regularization of voxel art," SIGGRAPH Talk 2018, 2018.

D. Cohen-Or, A. Kaufman, "Fundamentals of surface voxelization," Graphical models and image processing, vol. 57, No. 6, pp. 453-461, 1995.

D. Dolonius, E. Sintorn, V. Kämpe, U. Assarsson, "Compressing color data for voxelized surface geometry," IEEE Transactions on Visualization and Computer Graphics (TVCG), 2018.

D. G. Debry, J. Gibbs, D. D. Petty, N. Robins, "Painting and rendering textures on unparameterized models", ACM Transactions on Graphics (TOG), vol. 21, No. 3, pp. 763-768, 2002.

D. Kataoka, "Art and virtual reality, new tools, new horizons," Silicon Valley VR Expo., 2017.

D. F. Keefe, D. A. Feliz, T. Moscovich, D. H. Laidlaw, J. J. LaViola, Jr. "CavePainting: A Fully Immersive 3D Artistic Medium and Interactive Experience," Proceedings of the 2001 Symposium on Interactive 3D Graphics (I3D), pp. 85-93, 2001.

D. Keefe, R. Zeleznik, D. Laidlaw, "Drawing on Air: Input Techniques for Controlled 3D Line Illustration," IEEE Transactions on Visualization and Computer Graphics (TVCG), vol. 13, No. 5, pp. 1067-1081, 2007.

E. Gobbetti, F. Marton, J. A. I. Guitián, "A single-pass GPU ray casting framework for interactive out-of-core rendering of massive volumetric datasets," The Visual Computer, vol. 24, No. 7-9, pp. 797-806, 2008.

Ephtracy, "MagicaVoxel," https://ephtracy.github.io, 2013.

E. Rosales, J. Rodriguez, A. Sheffer, "SurfaceBrush: From Virtual Reality Drawings to Manifold Surfaces," arXiv e-prints, Article arXiv:1904.12297, 2019.

F. Losasso, F. Gibou, R. Fedkiw, "Simulating water and smoke with an octree data structure," ACM Transactions on Graphics (TOG), vol. 23, No. 3, pp. 457-462, 2004.

F. Reichl, M. Treib, R. Westermann, "Visualization of big SPH simulations via compressed octree grids," 2013 IEEE International Conference on Big Data, pp. 71-78, 2013.

Guillaumechereau, "Goxel" http://guillaumechereau.github.io/goxel/, 2015.

Google, "Tilt brush by google," https://www.tiltbrush.com/, 2015.

H. Samet, "Implementing ray tracing with octrees and neighbor finding," Computers & Graphics, vol. 13, No. 4, pp. 445-460, 1989.

HTC Corporation, "HTC Vive," https://www.vive.com/, 2011.

I. Boada, I. Navazo, R. Scopigno, "Multiresolution volume visualization with a texture-based octree," The Visual Computer, vol. 17, No. 3, pp. 185-197, 2001.

I. P. Howard, "Depth perception," Stevens' handbook of experimental psychology, 2002.

J. Chen, D. Bautembach, S. Izadi, "Scalable real-time volumetric surface reconstruction," ACM Transactions on Graphics (TOG), vol. 32, No. 4, 2013.

J. D. Macdonald, K. S. Booth, "Heuristics for ray tracing using space subdivision," The Visual Computer, vol. 6, No. 3, pp. 153-166, 1990.

J. Hakkinen, T. Vuori, M. Paakka, "Postural stability and sickness symptoms after HMD use," IEEE International Conference on Systems, Man and Cybernetics, vol. 1, pp. 147-152. 2002.

(56) References Cited

OTHER PUBLICATIONS

J. Kniss, A. Lefohn, R. Strzodka, S. Sengupta, J. D. Owens, "Octree textures on graphics hardware," ACM SIGGRAPH 2005 Sketches, 2005.

J. Kruger, R. Westermann, "Acceleration techniques for GPU-based volume rendering," Proceedings of the 14th IEEE Visualization 2003 (VIS), IEEE Computer Society, p. 38, 2003.

J. Lu, S. Diverdi, W. Chen, C. Barnes, A. Finkelstein, "RealPigment: Paint compositing by example," Proceedings of the 12th International Symposium on Non-photorealistic Animation and Rendering (NPAR), 2014.

J. Schmid, M. S. Senn, M. Gross, R. W. Sumner, "OverCoat: An Implicit Canvas for 3D Painting," ACM SIGGRAPH 2011 Papers, Article No. 28, 2011.

K. Bürger, J. Kruger, R. Westermann, "Direct volume editing," IEEE Transactions on Visualization and Computer Graphics (TVCG), vol. 14, No. 6, pp. 1388-1395, 2008.

K. Engel, M. Hadwiger, J. Kniss, C. Rezk-salama, D. Weiskopf, "Real-time volume graphics", CRC Press, 2006.

Khronos Group, "Uniform Buffer Object—OpenGL," https://www.khronos.org/opengl/wiki/Uniform_Buffer_Object, 2017.

K. Museth, "VDB: High-resolution sparse volumes with dynamic topology," ACM Transactions on Graphics (TOG), vol. 32, No. 3, 2013.

K. Zhou, M. Gong, X. Huang, B. Guo "Data-parallel octrees for surface reconstruction," IEEE Transactions on Visualization and Computer Graphics (TVCG), vol. 17, No. 5, pp. 669-681, 2011.

L. Olsen, F. F. Samavati, M. C. Sousa, J. A. Jorge, "Sketch-based modeling: A survey," Computers & Graphics, vol. 33, No. 1, pp. 85-103, 2009.

L. P. Kobbelt, M. Botsch, U. Schwanecke, H.-P. Seidel, "Feature sensitive surface extraction from volume data," Proceedings of the 28th Annual Conference on Computer Graphics and Interactive Techniques, pp. 57-66, 2001.

L. Siemon, "Voxelshop," https://blackflux.com/, 2013.

M. Agrawala, A. C. Beers, and M. Levoy, "3D painting on scanned surfaces," Proceedings of the 1995 symposium on Interactive 3D graphics (I3D), pp. 145-ff, 1995.

M. F. Deering, "HoloSketch: A Virtual Reality Sketching/Animation Tool," ACM Transations Computer-Human Interaction, vol. 2, No. 3, 1995.

M. Hadwiger, P. Ljung, C. R. Salama, T. Ropinski, "Advanced illumination techniques for GPU-based volume raycasting," ACM SIGGRAPH 2009 Courses, pp. 2:1-2:166, 2009.

M. Hadwiger, J. Beyer, W. Jeong, H. Pfister, "Interactive volume exploration of petascale microscopy data streams using a visualization-driven virtual memory approach," IEEE Transactions on Visualization and Computer Graphics (TVCG), vol. 18, No. 12, 2012.

Minddesk Software GMBH., "Qubicle," https://www.minddesk.com/, 2005.

M. Foskey, M. A. Otaduy, M. C. Lin, "ArtNova: touch-enabled 3D model design," Proceedings IEEE Virtual Reality 2002, pp. 119-126, 2002.

M. Harris, I. Buck, "GPU flow control idioms," GPU gems, vol. 2, pp. 547-555, 2005.

M. Kazhdan, H. Hoppe, "Screened poisson surface reconstruction," ACM Transactions on Graphics (TOG), vol. 32, No. 3, 2013.

Mojang, "Official site | minecraft," https://minecraft.net/en-us/?ref=m, 2009.

M. Pätzold, A. Kolb, "Grid-free out-of-core voxelization to sparse voxel octrees on GPU," Proceedings of the 7th conference on high-performance graphics (HPG), pp. 95-103, 2015.

M. Schwarz, H. P. Seidel, "Fast parallel surface and solid voxelization on GPUs," ACM Transactions on Graphics (TOG), vol. 29, No. 6, pp. 179, 2010.

M. Zollhöfer, P. Stotko, A. Görlitz, C. Theobalt, M. Nießner, R. Klein, A. Kolb, "State of the Art on 3D Reconstruction with RGB-D Cameras." Computer Graphics Forum, vol. 37, No. 2, pp. 625-652, 2018.

M. Zwicker, M. Pauly, O. Knoll, M. Gross, "Pointshop 3D:An Interactive System for Point-based Surface Editing," Proceedings of the 29th Annual Conference on Computer Graphics and Interactive Techniques, pp. 322-329, 2002.

Oculus, "Quill by story studio," https://storystudio.oculus.com/en-us/, 2016.

O. Klehm, I. Ihrke, H. Seidel, E. Eisemann, "Property and lighting manipulations for static volume stylization using a painting metaphor," IEEE Transactions on Visualization and Computer Graphics (TVCG), vol. 20, No. 7, pp. 983-995, 2014.

S. Longay, A. Runions, F. Boudon, P. Prusinkiewicz, "Treesketch: interactive procedural modeling of trees on a tablet," Proceedings of the international symposium on sketch-based interfaces and modeling, pp. 107-120, 2012.

S. M. Seitz, B. Curless, J. Diebel, D. Scharstein, R. Szeliski, "A comparison and evaluation of multi-view stereo reconstruction algorithms," IEEE Conference on Computer Vision and Pattern Recognition, pp. 519-528, 2006.

S. Popov, J. Günther, H.-P. Seidel, P. Slusallek, "Stackless kd-tree traversal for high performance GPU ray tracing," Computer Graphics Forum, vol. 26, No. 3, pp. 415-424, 2007.

S. Schkolne, M. Pruett, P. Schröder, "Surface Drawing: Creating Organic 3D Shapes with the Hand and Tangible Tools," Proceedings of the SIGCHI Conference on Human Factors in Computing Systems (CHI), pp. 261-268, 2001.

S. W. Wang, A. E. Kaufman, "Volume sampled voxelization of geometric primitives," Proceedings of the 4th conference on Visualization'93, pp. 78-84, 1993.

S. Tsang, R. Balakrishnan, K. Singh, A. Ranjan, "A Suggestive Interface for Image Guided 3D Sketching," Proceedings of the SIGCHI Conference on Human Factors in Computing Systems (CHI), pp. 591-598, 2004.

T. Igarashi, D. Cosgrove, "Adaptive unwrapping for interactive texture painting," Proceedings of the 2001 symposium on Interactive 3D graphics, pp. 209-216, 2001.

T. Igarashi, S. Matsuoka, H. Tanaka, "Teddy: a sketching interface for 3D freeform design," ACM SIGGRAPH 2007 courses, 2007.

P. Hanrahan, P. Haeberli, "Direct WYSIWYG Painting and Texturing on 3D Shapes," ACM SIGGRAPH Computer Graphics, vol. 24, No. 4, pp. 215-223, 1990.

R. Brucks, "Content-Driven Multipass Rendering in UE4," https://youtu.be/QGIKrD7uHu8 GDC, 2017.

R. D. Kalnins, L. Markosian, B. J. Meier, M. A. Kowalski, J. C. Lee, P. L. Davidson, M. Webb, J. F. Hughes, A. Finkelstein, "WYSIWYG NPR: Drawing strokes directly on 3D models," ACM Transactions on Graphics (TOG), vol. 21, pp. 755-762, 2002.

R. K. Hoetzlein, "GVDB: Raytracing sparse voxel database structures on the GPU," Proceedings of High Performance Graphics (HPG), pp. 109-117, 2016.

R. Patterson, M. D. Winterbottom, B. J. Pierce, "Perceptual issues in the use of head-mounted visual displays," Human factors, vol. 48, No. 3, pp. 555-573, 2006.

R. Setaluri, M. Aanjaneya, S. Bauer, E. Sifakis, "SPGrid: A sparse paged grid structure applied to adaptive smoke simulation," ACM Transactions on Graphics (TOG), vol. 33, No. 6, pp. 205, 2014.

S. Bruckner, M. E. Groller, "Volumeshop: An interactive system for direct volume illustration," IEEE Visualization (VIS), 2005.

S. Diverdi, "A brush stroke synthesis toolbox," Springer London, pp. 23-44, 2013.

S. F. Frisken, R. N. Perry, A. P. Rockwood, T. R. Jones, "Adaptively sampled distance fields: A general representation of shape for computer graphics," Proceedings of the 27th Annual Conference on Computer Graphics and Interactive Techniques, pp. 249-254. 2000.

S. Lefebvre, S. Hornus, F. Neyret, "Octree textures on the GPU," GPU Gems 2, Pharr M., (Ed.). Addison-Wesley, pp. 595-613, 2005.

S. Laine, T. Karras, "Efficient sparse voxel octrees," Proceedings of the 2010 ACM SIGGRAPH Symposium on Interactive 3D Graphics and Games, pp. 55-63, 2010.

T. Ize, "Robust BVH ray traversal—revised," Journal of Computer Graphics Techniques (JCGT), vol. 2, No. 2, pp. 12-27, 2013.

T. Ju, F. Losasso, S. Schaefer, J. Warren, "Dual contouring of hermite data," ACM Transactions on Graphics (TOG), vol. 21, No. 3, pp. 339-346, 2002.

(56) References Cited

OTHER PUBLICATIONS

V. Havran, J. Bittner, J. Žára, "Ray tracing with rope trees," 14th Spring Conference on Computer Graphics, pp. 130-140, 1998.

W. V. Baxter, J. Wendt, M. C. Lin, "IMPaSTo: A realistic, interactive model for paint," In Proceedings of the International Symposium on Non-Photorealistic Animation and Rendering (NPAR), pp. 45-56. 10, 2004.

Y. Kim, B. Kim, Y. J. Kim, "Dynamic Deep Octree for High-resolution Volumetric Painting in Virtual Reality," Computer Graphics Forum, vol. 37, No. 7, pp. 179-190, 2018.

Y. Gingold, T. Igarashi, D. Zorin, "Structured Annotations for 2D-to-3D Modeling," ACM SIGGRAPH Asia 2009 Papers (SIGGRAPH Asia), No. 148, p. 9, 2009.

Y. J. Kil, P. Renzulli, O. Kreylos, B. Hamann, G. Monno, O. G Staadt, "3D warp brush modeling," Computers & Graphics, vol. 30, No. 4, pp. 610-618, 2006.

Z. Chen, B. Kim, D. Ito, H. Wang, "Wetbrush: GPU-based 3D painting simulation at the bristle level," ACM Transactions on Graphics (TOG), vol. 34, No. 6, 2015.

\* cited by examiner

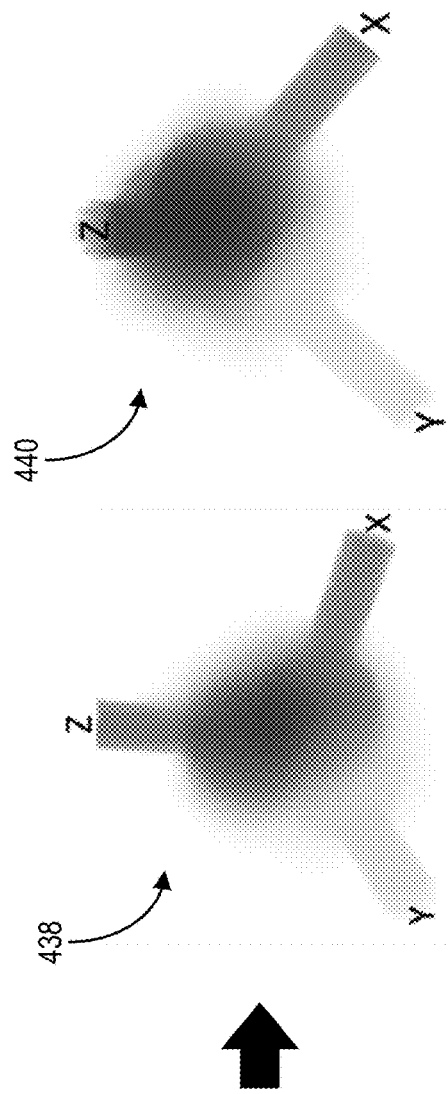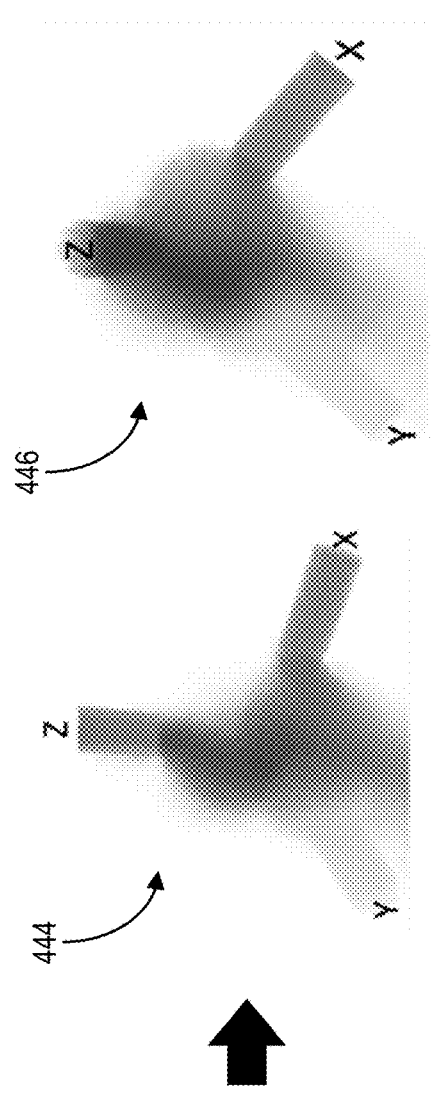
Fig. 4C
Fig. 4D

MODIFYING THREE-DIMENSIONAL REPRESENTATIONS USING DIGITAL BRUSH TOOLS

BACKGROUND

Recent years have seen a rapid increase in the use of computer graphic hardware and software solutions for creating three-dimensional ("3D") digital content. In particular, conventional computer graphics systems can generate and manipulate 3D digital content such as video game graphics, VR-based illustrations, or three-dimensional videos. Indeed, conventional computer graphics systems can now generate various 3D representations (e.g., voxel dot designs and/or 3D models) based on user input within a three-dimensional virtual environment. However, many conventional computer graphics systems have a number of shortcomings. In particular, conventional computer graphics systems are often inefficient, inflexible, and inaccurate in modifying 3D representations, particularly voxel-based 3D representations.

For instance, conventional computer graphics systems are often inefficient. Indeed, conventional systems can consume large amounts of memory due to the volumetric nature of voxels, voxels having varying sizes within a 3D representation, and/or the number of voxels present within a 3D representation. For example, a 1000×1000 image can include 1000×1000×1000 voxels and conventional computer graphics systems often consume large amounts of memory to modify and render such a large number of voxels. To illustrate, some conventional systems enable users to modify voxels using ray tracing and/or path tracing to select individual voxels. Such approaches often take significant amounts of time and computational resources for 3D representations having large numbers of voxels (e.g., millions of voxels). Accordingly, many conventional computer graphics systems fail to modify a large number of voxels collectively while efficiently managing memory consumption.

Furthermore, conventional computer graphics systems are often inflexible and utilize complex tools (e.g., shape visualization, shape representation, texture mapping, sculpting, parametric controls of material properties, etc.) to modify voxel-based 3D representations. Such tools, however, are often time-consuming, tedious, and counter-intuitive for modifying voxel-based 3D representations. For example, conventional systems for painting on models often requires rigid processes that are difficult to utilize because (1) creating an underlying model is a prerequisite for following texture mapping/authoring, (2) discordance between model space and texture space requires parameterization, and (3) painting on models cannot fully exploit 3D space. Furthermore, many conventional computer graphics systems that utilize complex tools are often underutilized and inaccessible to novice computer-graphic artists.

Additionally, conventional computer graphics systems often utilize surface painting to modify voxel-based 3D representations. Such systems, however, are often inaccurate. In particular, simplified painting methods that are meant for 2D-based digital art often fail to accurately translate over to voxel-based 3D representations because of the volumetric nature and size variances of voxels. Indeed, many conventional computer graphics systems fail to accurately provide natural attributes of painting (e.g., partial modification of colors, stroke composition, etc.) in a 3D painting environment for voxels of a 3D representation by utilizing simplified painting methods.

Accordingly, conventional computer graphics systems have a number of significant shortcomings in relation to the efficiency, flexibility, and accuracy of creating and/or modifying voxel-based 3D digital content.

SUMMARY

The disclosure describes one or more embodiments that provide benefits and/or solve one or more of the foregoing problems with systems, computer-readable media, and methods that allow for efficient, accurate, and intuitive modification of voxels in a 3D representation using 3D digital brush tools. In particular, in one or more embodiments, the disclosed systems modify a large number of voxels within a 3D painting environment (e.g., a virtual reality environment) using 3D digital brush tool effects. For instance, in some embodiments, the disclosed systems use 3D digital brush tools such as a 3D blur brush tool, 3D smudge brush tool, and/or 3D resolution brush tool (e.g., 3D melt brush tool) to efficiently and accurately modify voxels in 3D representations. For example, the disclosed systems can utilize multiple RGBA buffers to store visual properties (e.g., color and/or alpha values) of voxels, diffuse visual properties, compare visual properties across the various RGBA buffers, and then render voxel colors to impose blur, smudge, and/or smoothing effects within a 3D representation.

Furthermore, the disclosed systems can also dynamically render a 3D representation having voxels using various depths within an octree corresponding to the 3D representation. By utilizing various depths of voxels within an octree in response to selection of one or more voxel sizes, the disclosed systems can display 3D representations at different levels of detail. Using this voxel mosaic approach, the disclosed systems can accelerate other brush effects by reducing the number of voxels in the 3D representation and/or reduce memory consumption of 3D representations. Indeed, while preserving similar appearance, the disclosed systems can reduce memory consumption of a three-dimensional model by more than 70%.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which:

FIGS. 4C and 4D illustrate an example of applying a blur effect and a smudge effect to one or more voxels in accordance with one or more embodiments.

DETAILED DESCRIPTION

Figure 1:
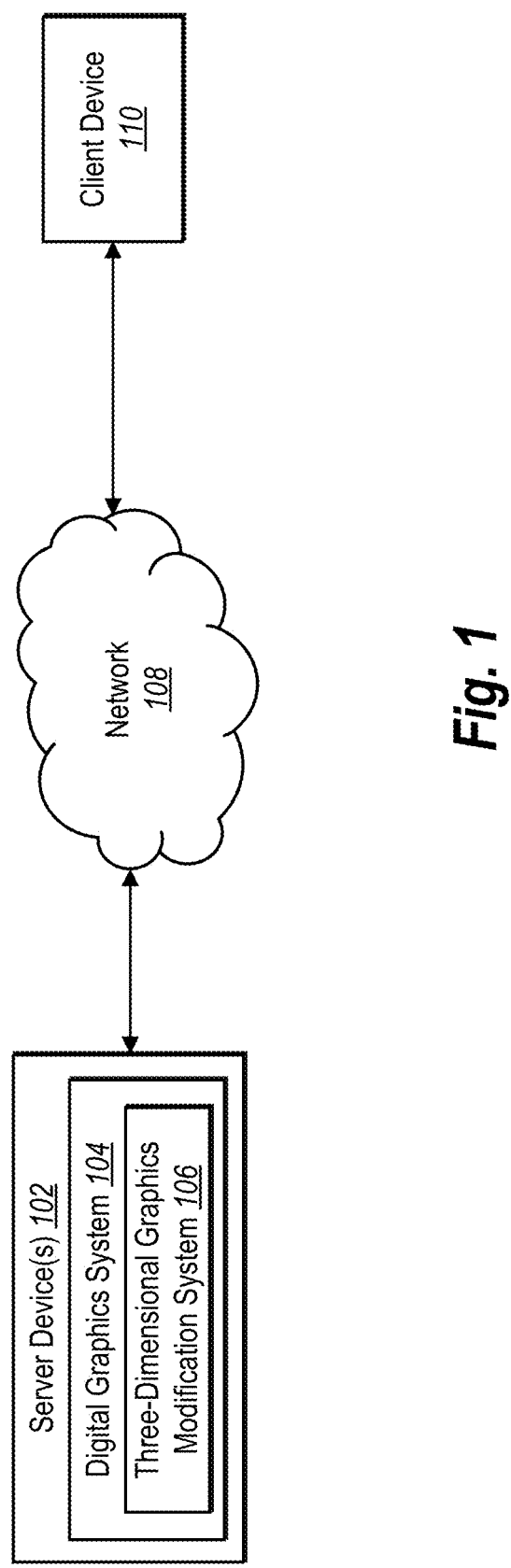
FIG. 1 illustrates a schematic diagram of an example environment in which a three-dimensional graphics modification system can operate in accordance with one or more embodiments.

One or more embodiments of the present disclosure include a three-dimensional graphics modification system that can efficiently, accurately, and intuitively modify voxels in a 3D representation using 3D digital brush tools. In particular, the three-dimensional graphics modification system can modify a large number of voxels within a 3D painting environment (e.g., a virtual reality environment) using 3D digital brush tool effects such as a 3D blur brush tool, a 3D smudge brush tool, and/or a 3D smooth brush tool (e.g., a 3D melt brush tool). For instance, the three-dimensional graphics modification system can utilize multiple buffers to store and modify visual properties that correspond to one or more voxels selected by a 3D digital brush tool. The three-dimensional graphs modification system can analyze the visual properties within the multiple buffers to update and/or render voxels within a 3D representation to reflect different visual effects. For example, the three-dimensional graphics modification system can diffuse visual properties, compare color and/or alpha values, and/or apply alpha validity tests to apply blur, smudge, or smooth effects to voxels of a 3D representation. Additionally, the three-dimensional graphics modification system can also render voxels of a 3D representation utilizing selectable depths of an octree to provide more or less detail (and memory usage) for the voxel-based 3D representation.

As just mentioned, the three-dimensional graphics modification system can modify voxels of a 3D representation using a 3D digital brush tool to provide a blur effect. To illustrate, in one or more embodiments, the three-dimensional graphics modification system identifies voxels intersecting with a blur brush tool in a virtual environment. The three-dimensional graphics modification system can generate a first RGBA buffer having the original RGBA values of the intersecting voxels. Furthermore, the three-dimensional graphics modification system can generate a second RGBA buffer by diffusing the RGBA values for voxels from the first RGBA buffer with RGBA values from neighboring voxels. For example, in order to achieve the blur effect, the three-dimensional graphics modification system can utilize six neighbors for each of the voxels to diffuse the RGBA values.

Upon generating the second RGBA buffer with diffused RBGA values, the three-dimensional graphics modification system can select colors to render from the colors of the first RGBA buffer or the diffused colors of the second RGBA buffer. In particular, the three-dimensional graphics modification system can select RGBA values based on alpha values from the second RGBA buffer. Specifically, in some embodiments, the three-dimensional graphics modification system selects RGBA from the first RGBA buffer when a corresponding RGBA value is transparent in the second RGBA buffer (e.g., the alpha value equals 0), otherwise the three-dimensional graphics modification system utilizes the RGBA value from the second RGBA buffer. In this manner, the three-dimensional graphics modification system can apply a blur effect to voxels of a 3D representation using a 3D blur brush tool.

As mentioned above, the three-dimensional graphics modification system can also apply a smudge effect using a 3D smudge brush tool. To apply a smudge brush tool, the three-dimensional graphics modification system can utilize a similar approach to the blur brush tool, while diffusing RGBA values in a particular direction. For instance, rather than diffusing RGBA values of the second RGBA buffer using six neighboring voxels, the three-dimensional graphics modification system can diffuse RGBA values using a subset of neighboring voxels selected based on a direction of movement of the smudge brush tool. To illustrate, if the smudge brush tool moves in a downward direction, the three-dimensional graphics modification system can diffuse colors to a voxel based on the three neighboring voxels closest to an upward direction.

In applying a 3D blur brush tool and/or a 3D smudge brush tool, the three-dimensional graphics modification system can also adjust voxel sizes. For example, the three-dimensional graphics modification system can split and/or merge one or more voxels based on opacity values. In this manner, the three-dimensional graphics modification system can apply blur or smudge effects while maintaining definition and detail of a three-dimensional representation.

In addition to 3D blur brush tools and 3D smudge brush tools, the three-dimensional graphics modification system can also apply a 3D smooth (or melt) brush tool. For instance, in applying a smoothing effect, the three-dimensional graphics modification system can apply an alpha validity test and then, based on the results of the alpha validity test, select alpha values to render, remove colors, and/or modify (or smooth) voxel sizes.

To illustrate, the three-dimensional graphics modification system can generate a third alpha buffer having the original alpha values of the intersecting voxels. The three-dimensional graphics modification system can compare the original alpha values (from the third alpha buffer) and the diffused alpha values (from the modified first RGBA buffer). Based on the comparison, the three-dimensional graphics modification system can select alpha values to render (e.g., make certain voxels transparent), remove color from select voxels, merge voxels in which colors have been removed, and/or adjust voxel sizes to smooth the 3D representation.

Furthermore, as previously mentioned, the three-dimensional graphics modification system can also render voxels of a 3D representation at varying depths of detail within an octree to provide more or less detail for the voxel-based 3D representation. For example, the three-dimensional graphics modification system can receive a selection of a plurality of voxels (e.g., corresponding to a region of a 3D representation) and a target voxel size for the plurality of voxels. Then, the three-dimensional graphics modification system can identify, within an octree corresponding to the plurality of voxels, the voxels having a size smaller than or equal to the target voxel size (e.g., voxels of an octree depth corresponding to a voxel size smaller than the target voxel size). Indeed, the three-dimensional graphics modification system can merge the voxels having a voxel size smaller than the target voxel size using a blending mode (e.g., alpha blending). In particular, the three-dimensional graphics modification system can iteratively merge the voxels having the size smaller than the target voxel size within the octree until the voxels are larger than or equal to the target voxel size. Additionally, the three-dimensional graphics modification system can also provide a preview of the 3D representation using the octree and the selected target voxel size.

The three-dimensional graphics modification system provides several advantages over conventional systems. For example, the three-dimensional graphics modification system can modify voxel-based 3D representations with improved efficiency compared to conventional systems. For instance, the 3D brush tools for applying blur effects, smudge effects, and/or smoothing effects on voxels of a 3D representation can require fewer resources than complex algorithms utilized by many conventional systems. In addition, the three-dimensional graphics modification system reduces the number of steps required to modify voxels within 3D representations (e.g., without the use of ray tracing, etc.) further reducing time and computational resources required by many conventional systems.

The three-dimensional graphics modification can also improve efficiency in other ways. For instance, by utilizing a 3D digital smooth brush tool to merge voxels, the three-dimensional graphics modification system can further reduce the memory used in rendering and manipulating a 3D representation. Furthermore, by dynamically rendering voxels of a 3D representation at varying depths of detail within an octree, the three-dimensional graphics modification system can reduce the memory used by a 3D representation by reducing the number of voxels in the 3D representation. In addition, the three-dimensional graphics modification system can also accelerate other brush effects by reducing the number of voxels in the 3D representation due to the mosaic filter (e.g., use less processing to modify the reduced number of voxels).

Moreover, the three-dimensional graphics modification system can also improve flexibility relative to some conventional systems. Indeed, as previously mentioned, the three-dimensional graphics modification system can modify (or manipulate) a large number of voxels collectively (e.g., in a brush stroke). This enables the three-dimensional graphics modification system to modify voxel-based 3D representations having any number of voxels and/or having any number of voxel size variances. The three-dimensional graphics modification system can also provide more flexible control over what portions or voxels to modify by implementing interactive 3D brush tools within an interactive virtual reality space. Moreover, the three-dimensional graphics modification system can also modify voxel-based 3D representations more intuitively by providing tools that accomplish blur, smudge, and/or smoothing effects with simple brush strokes rather than having to manipulate voxels using ray tracing or other approaches employed by conventional systems.

Additionally, the three-dimensional graphics modification system can also modify properties of voxels in a voxel-based 3D representation with more accuracy compared to some conventional systems. For instance, by providing intuitive 3D brush tools to accomplish blur effects, smudge effects, and/or smoothing effects on voxels of a 3D representation within a virtual environment, the three-dimensional graphics modification system can implement modifications to voxels that are akin to natural attributes of painting in comparison to some conventional systems. As an example, rather than painting model surfaces as done by conventional systems, the three-dimensional graphics modification system can modify voxels that are present on a surface of a 3D representation and also voxels that are present within the 3D representation (e.g., within the volume of the 3D representation).

As illustrated by the foregoing discussion, the present disclosure utilizes a variety of terms to describe features and advantages of the three-dimensional graphics modification system. Additional detail is now provided regarding the meaning of such terms. For example, as used herein, the term "voxel" refers to an element of volume within a three-dimensional space (3D space). In particular, voxels can include a discrete element into which a 3D representation is divided. For instance, a voxel can include a digital item in an array that represents a visual property (e.g., color and/or opacity) within 3D space. To illustrate, a voxel can include a representation of a cube corresponding to a color and/or opacity of a location in three-dimensional space.

Furthermore, as used herein, the term "3D digital brush tool" (or sometimes referred to as "digital brush tool" or "brush tool") refers to a volumetric model that modifies (and/or creates) elements for volume rendering in a 3D space. In particular, a 3D digital brush tool can include an interactive tool within a user interface that selects and/or modifies voxels in a 3D space. For instance, a 3D digital brush tool can include a blur brush tool, a smudge brush tool, and a smooth brush tool.

Specifically, as used herein, the term "blur brush tool" refers to a 3D digital brush tool modifies voxels using a blur effect (e.g., causing a blur or blending effect on visual properties corresponding to the intersected voxels). Furthermore, as used herein, the term "smudge brush tool" refers to a 3D digital brush tool that modifies voxels using a smudge effect (e.g., causing a blur or blending effect on visual properties in a particular direction). Indeed, in one or more embodiments, a smudge brush tool is a specific type of blur brush tool that modifies (e.g., diffuses) visual properties of intersected voxels in a particular direction. Moreover, as used herein, the term "smooth brush tool" (sometimes referred to as "melt brush tool") refers to a 3D digital brush tool that modifies voxels using a smoothing effect (e.g., by causing a reduction in the size (or resolution) of intersected voxels based on the diffusion of the intersected voxels). The blur brush tool, the smudge brush tool, and the smooth brush tool are described in greater detail in the figures below (e.g., FIGS. 4A-4D and 5A-5F).

Moreover, as used herein, the term "three-dimensional representation" (sometimes referred to as "3D representation") refers to a three-dimensional object, drawing, or model. In particular, the term "three-dimensional representation" can include a visual representation of an object that is portrayed using one or more data points or elements (e.g., voxels) in a 3D space. Indeed, a 3D representation can have one or more voxels that represent visual properties of the 3D representation in 3D space. For example, a 3D representation can include a 3D models for 3D graphics (e.g., video game objects, computer graphics animations, computer-aided design objects, etc.). Moreover, a 3D representation can include a digital image and/or an object with the following, or other, file extensions: DN, OBJ, GLTF, or GLB).

As used herein, the term "buffer" (sometimes referred to as "data buffer") refers to a collection or set of data. In particular, the term "buffer" refers to a portion (or region) of memory storage used for storing a set of data. For instance, a buffer can include memory storage utilized to store data during a data transfer process, graphics rendering process, and/or graphics modification process. In one or more embodiments, a buffer can include a physical memory storage used to store data (e.g., visual properties of one or more voxels) and/or a software-based representation of a set of data (e.g., data included in a set, array, list, etc.). Indeed, the three-dimensional graphics modification system can utilize multiple buffers to store data corresponding to voxels and/or visual properties of voxels while rendering and/or updating one or more voxels.

Additionally, as used herein, the term "visual property" refers to a characteristic, feature, or attribute of visual appearance. In particular, a visual property can include attributes such as, but not limited to, color, opacity, light, texture, or saturation. In addition, the three-dimensional graphics modification system can include a rendering set of visual properties (e.g., for voxels) that are used to render a 3D representation for display.

Furthermore, as used herein, the term "color" refers to a visual property that reflects hue, saturation, and/or brightness of light. For example, the term "color" can include properties corresponding to an RGB channel (or color space), an HSV (i.e., hue, saturation, value) color space, and/or a CIE L*a*b ("CIELAB") color space. Moreover, as used herein, the term "opacity" refers to a visual property that reflects translucency of an object (e.g., an opacity value that measures how much light an object or voxel reflects). For instance, opacity can include an alpha (or alpha channel) in RGBA and/or a percentage of translucence associated with an object. As used herein, the term "RGBA" refers to a four-channel model that represents channels for red, green, blue color values and a channel for an alpha value (e.g., corresponding to an opacity) for an object (e.g., a voxel and/or pixel). Although many examples herein discuss embodiments that utilize RGBA measures (e.g., RGBA buffers) the three-dimensional graphics modification system can utilize a variety of different colors/opacity schemes to apply modifications to voxels in a 3D representation.

As used herein, the term "alpha validity threshold" refers to a value utilized to perform an alpha validity test while modifying and rendering a voxel in response to a brush stroke interaction with the voxel. In particular, the alpha validity threshold is described in greater detail in FIGS. 5A-5F.

As used herein, the term "mosaic filter" (sometimes referred to as "mosaic filter tool") refers to a filter feature of the three-dimensional graphics modification system that merges voxels in a 3D representation based on a target voxel size. In particular, the mosaic filter is described in greater detail in FIGS. 6A-6B.

As used herein, the term "octree" refers to a tree-based data structure that includes one or more nodes having children nodes (e.g., eight children nodes for each parent node). In particular, the term "octree" can include a tree data structure that is partitioned into one or more recursive octants of visual properties for a 3D space. Indeed, an octree can include nodes reflecting voxels (and/or visual properties of voxels). Furthermore, an octree can include voxels of varying sizes at each depth of the octree (e.g., a node having a voxel of a first size and a child node having voxels of a second size). In one or more embodiments, the three-dimensional graphics modification system utilizes an octree to render a 3D representation based on voxel information corresponding to the octree.

As used herein, the term "voxel size" refers to an attribute corresponding to the amount of space a voxel represents in a 3D space. In particular, the term "voxel size" refers to an amount of volume and/or space a voxel (and/or the visual properties of the voxel) occupies in a 3D space. For example, the three-dimensional graphics modification system can utilize voxels having different voxel sizes based on the depth of a voxel within an octree (e.g., a child node in the octree can include voxels smaller in size compared to parent nodes).

As used herein, the term "blending mode" refers to a technique utilized to merge one or more voxels (or visual properties of a voxel). For instance, a blending mode can include alpha blending. Specifically, as used herein, the term "alpha blending" refers to process of utilizing an alpha channel corresponding to one or more voxels to modify the visual properties of the one or more voxels (e.g., cause one or more voxels to be transparent and/or opaque). For example, alpha blending (or a blending mode) can include maximum alpha blending, average alpha blending, etc.

Turning now to the figures, FIG. 1 illustrates a schematic diagram of a system environment 100 (or an "environment 100") in which a three-dimensional graphics modification system 106 can operate in accordance with one or more embodiments. As illustrated in FIG. 1, the environment 100 includes server device(s) 102, a network 108, and a client device 110. As further illustrated in FIG. 1, the server device(s) 102 and the client device 110 can communicate via the network 108.

As shown in FIG. 1, the server device(s) 102 can include a digital graphics system 104 which further includes the three-dimensional graphics modification system 106. The digital graphics system 104 can generate, store, modify, send, or receive a variety of graphics or graphical models, including three-dimensional representations. The digital graphics system 104 can also visual three-dimensional representations. For example, the digital graphics system 104 can render three-dimensional representations within a virtual reality environment. The digital graphics system 104 can also provide such a rendering for display via the client device 110.

Moreover, the three-dimensional graphics modification system 106 can modify one or more voxels (and/or a 3D representation having voxels). In particular, the three-dimensional graphics modification system 106 can utilize one or more 3D digital brush tools (e.g., a blur brush tool, a smudge brush tool, and/or a melt brush tool) to generate an enhanced 3D representation. Moreover, the three-dimensional graphics modification system 106 can utilize a mosaic filter tool to modify voxel sizes and generate enhanced 3D representations in accordance with one or more embodiments.

In addition to implementing all or a part of the three-dimensional graphics modification system 106, the server device(s) 102 can store data for the three-dimensional graphics modification system 106. For example, the server device(s) 102 can store data such as digital content (e.g., 3D representations, digital images, voxels), digital tools (e.g., 3D digital brush tools and/or filter tools), and/or 3D spaces (e.g., a virtual reality painting environment). Moreover, the server device(s) 102 can provide such stored data to the client device 110. Furthermore, the server device(s) 102 can include a variety of types of computing devices, including those explained below with reference to FIG. 10.

Additionally, as mentioned above and as shown in FIG. 1, the environment 100 includes the client device 110. In one or more embodiments, the client device 110 may include, but is not limited to, a virtual reality device, a mobile device (e.g., a smartphone, tablet), a laptop, a desktop, or another type of computing device as described below with reference to FIG. 10. For instance, the client device 110 can include a virtual reality device enabled to provide (and/or display) a virtual reality 3D painting space and/or 3D digital tools (e.g., a 3D digital brush tool) to modify (or create) voxel-based 3D representations within the virtual reality 3D painting space. For example, the client device 110 can receive inputs from a user for one or more 3D digital tools (e.g., a blur brush tool, a smudge brush tool, a melt brush tool, and/or a mosaic filter tool) in relation to a 3D representation within a display of the client device 110. Furthermore, the client device 110 can provide such inputs to the three-dimensional graphics modification system 106 in order to modify one or more voxels using the one or more 3D digital tools in accordance with one or more embodiments. Moreover, although FIG. 1 illustrates the environment 100 with the client device 110, the environment 100 can include a plurality of client devices.

Additionally, as shown in FIG. 1, the environment 100 includes the network 108. As mentioned above, the network 108 can enable communication between components of the environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 102, the client device 110, and the network 108 may communicate using any communication platforms and technologies suitable for transporting data and/or communication signals, including any known communication technologies, devices, media, and protocols supportive of data communications, examples of which are described with reference to FIG. 10. Furthermore, although FIG. 1 illustrates the server device(s) 102 and the client device 110 communicating via the network 108, the various components of the environment 100 can communicate and/or interact via other methods (e.g., the server device(s) 102 and the client device 110 can communicate directly).

In addition, although FIG. 1 illustrates the three-dimensional graphics modification system 106 being implemented by a particular component and/or device (e.g., server device(s) 102) within the environment 100, the three-dimensional graphics modification system 106 (and/or the digital graphics system 104) can be implemented, in whole or in part, by other computing devices and/or components in the environment 100. For example, the three-dimensional graphics modification system 106 (and/or the digital graphics system 104) can be implemented in whole, or in part, by the client device 110.

Figure 2:
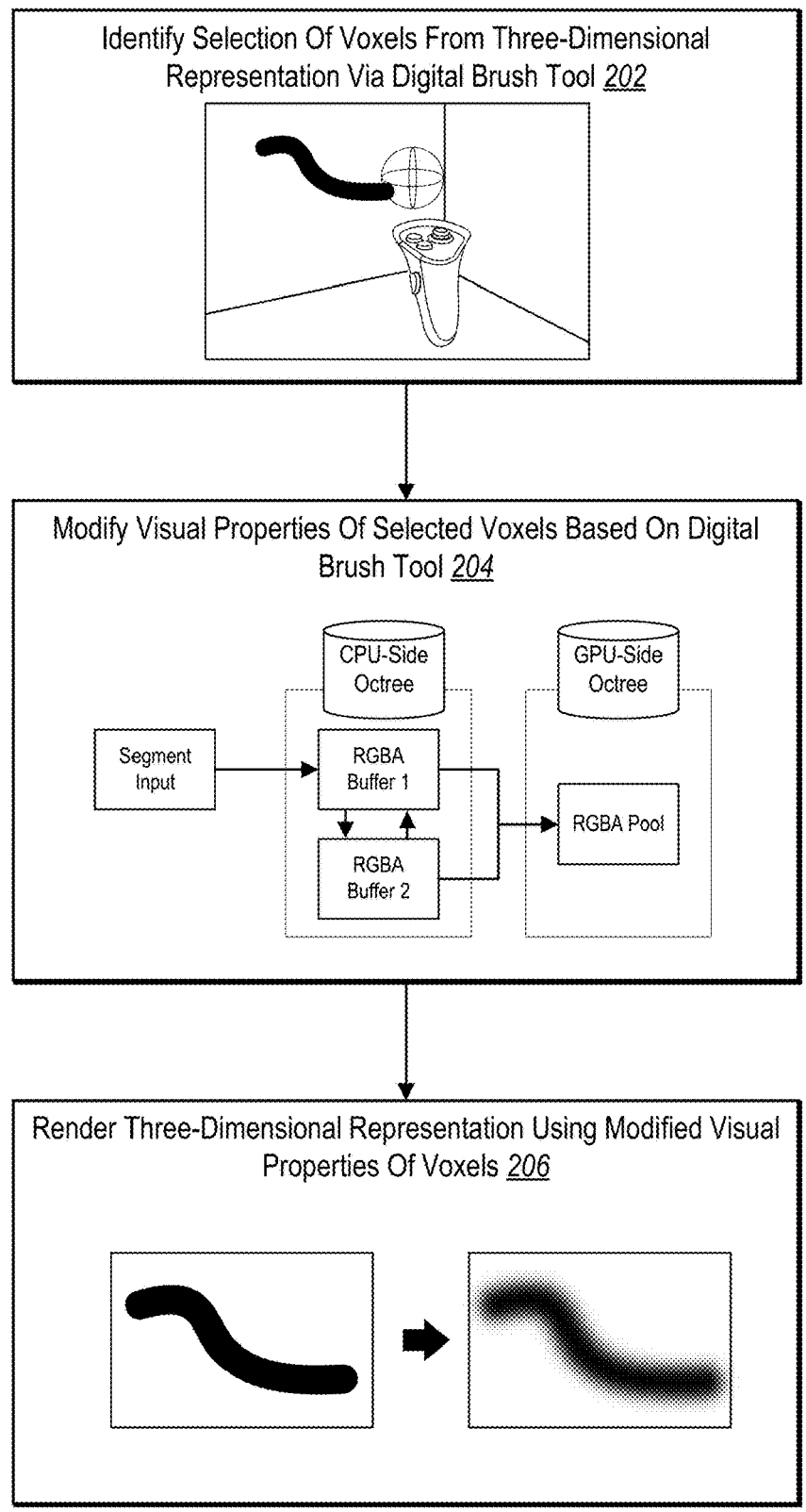
FIG. 2 illustrates a flowchart of a three-dimensional graphics modification system modifying one or more voxels of a 3D representation and rendering the 3D representation in accordance with one or more embodiments.

As mentioned above, the three-dimensional graphics modification system 106 can modify one or more voxels using one or more 3D digital brush tools (e.g., a blur brush tool, a smudge brush tool, and/or a melt brush tool) and/or a mosaic filter tool. For example, FIG. 2 illustrates an overview of the three-dimensional graphics modification system 106 modifying one or more voxels of a 3D representation and rendering the 3D representation with the modified voxels. In particular, FIG. 2 illustrates an overview of the three-dimensional graphics modification system 106 identifying a selection of voxels (of a 3D representation) via a digital brush tool, modifying visual properties of the selected voxels, and rendering the 3D representation using the modified visual properties of the selected voxels.

For example, as shown in FIG. 2, the three-dimensional graphics modification system 106 can identify a selection of voxels from a 3D representation via a digital brush tool in an act 202. In particular, the three-dimensional graphics modification system 106 can receive interactions with a digital brush tool (from a user) within a virtual reality environment (e.g., a virtual reality 3D painting space) by applying brush strokes on segments of a 3D representation. Furthermore, the three-dimensional graphics modification system 106 can detect voxels that intersect with a brush stroke from the digital brush tool within the virtual reality environment. The three-dimensional graphics modification system 106 can identify a selection of voxels via a digital brush tool as described in greater detail below (e.g., as described in relation to FIG. 3).

Additionally, as illustrated in FIG. 2, the three-dimensional graphics modification system 106 can modify visual properties of selected voxels based on a digital brush tool in an act 204. Indeed, the three-dimensional graphics modification system 106 can modify visual properties of one or more voxels based on the type of digital brush tool utilized (e.g., a blur brush tool, a smudge brush tool, a melt brush tool, a mosaic filter tool). For instance, the three-dimensional graphics modification system 106 can utilize multiple buffers having visual properties of the voxels (on a CPU-side octree and a GPU-side octree) to render and/or update the selected voxels according to a selected brush tool. Moreover, the three-dimensional graphics modification system 106 can also utilize voxels within an octree corresponding to the 3D representation to modify the voxel sizes based on a target voxel size (e.g., the mosaic filter tool). For example, three-dimensional graphics modification system 106 can modify visual properties of one or more voxels as described in greater detail below (e.g., as described in FIGS. 4A-4D, 5A-5F, and 6A-6B).

Moreover, as shown in FIG. 2, the three-dimensional graphics modification system 106 can render a 3D representation using modified visual properties of voxels in an act 206. In particular, the three-dimensional graphics modification system 106 can render one or more voxels (of a 3D representation) with modified visual properties during and after a brush stroke of a digital brush tool (e.g., while a user is actively using a digital brush tool) using multiple buffers (on a CPU-side octree and a GPU-side octree). Furthermore, the three-dimensional graphics modification system 106 can also render one or more voxels at varying sizes based on an octree associated with a 3D representation using a target voxel size. For instance, the three-dimensional graphics modification system 106 can render a 3D representation using modified visual properties of voxels as described in greater detail below (e.g., as described in FIGS. 4A-4D, 5A-5F, and 6A-6B).

As mentioned above, the three-dimensional graphics modification system 106 can identify a selection of voxels from a 3D representation via a digital brush tool. Indeed, the three-dimensional graphics modification system 106 can provide a 3D digital brush tool within a virtual reality environment to select one or more voxels of a 3D representation. For instance, FIG. 3 illustrates the three-dimensional graphics modification system 106 detecting a 3D brush tool interaction (e.g., a brush stroke) that intersects one or more voxels to select the one or more voxels for modification within a virtual reality environment.

Figure 3:
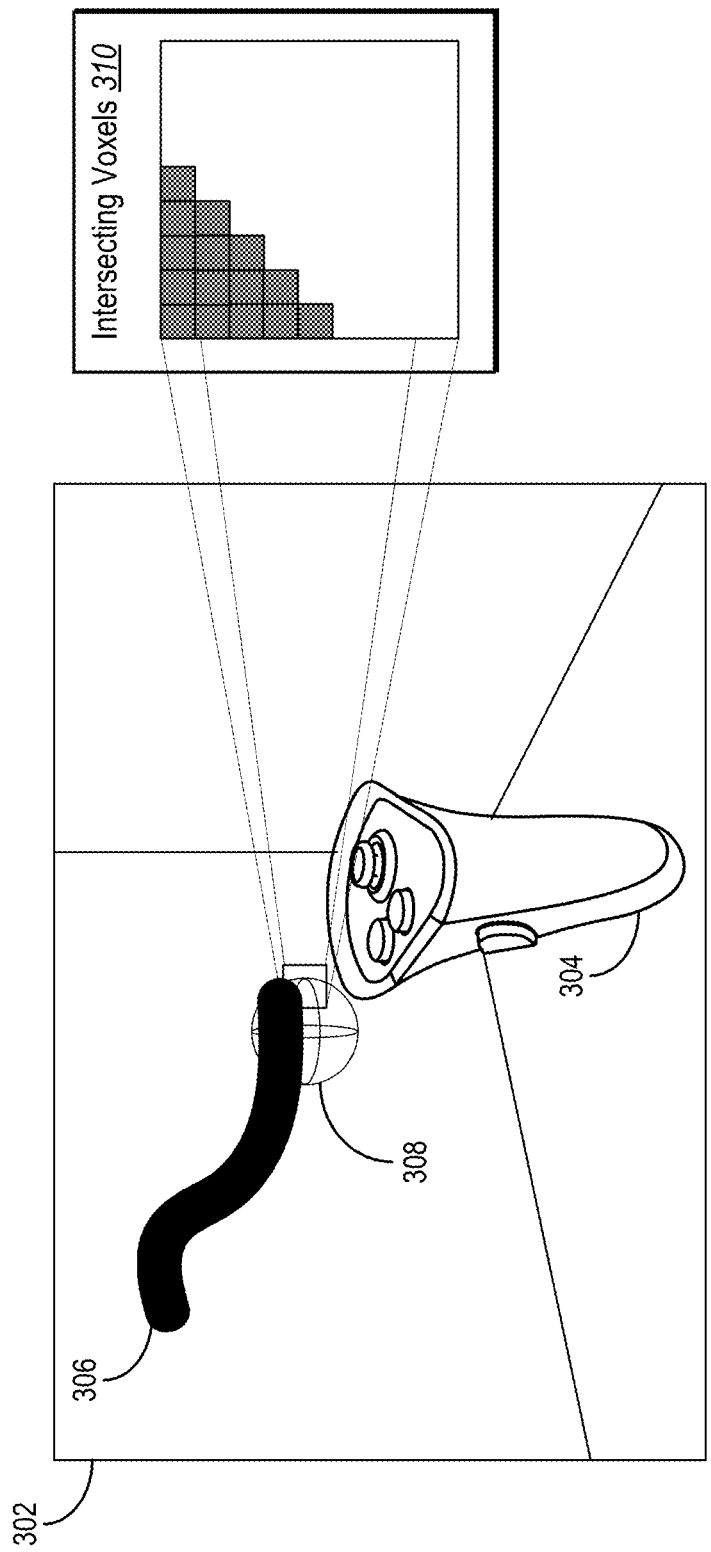
FIG. 3 illustrates a three-dimensional graphics modification system detecting a 3D digital brush tool interaction for selecting one or more voxels for modification in accordance with one or more embodiments.

In particular, as shown in FIG. 3, the three-dimensional graphics modification system 106 can provide, within a virtual reality 3D painting space 302, a 3D digital brush tool 304 to interact with a 3D representation 306 (e.g., a 3D graphical object having one or more voxels). Furthermore, as shown in FIG. 3, the three-dimensional graphics modification system 106 can detect (e.g., during a brush stroke with the digital brush tool 304) one or more voxels that intersect with a brush segment 308 of the 3D digital brush tool 304 (e.g., by looping through voxels of a 3D representation to detect voxels that are intersecting a brush segment). Indeed, as shown in FIG. 3, the three-dimensional graphics modification system 106 can detect a segment of voxels from the 3D representation 306 corresponding to an interaction with the brush segment 308 as the intersecting voxels 310. Moreover, the three-dimensional graphics modification system 106 can modify the intersecting voxels 310 based on a digital brush mode in accordance with one or more embodiments herein.

In one or more embodiments, the three-dimensional graphics modification system 106 provides a 3D representation for display within a virtual reality environment. Indeed, the three-dimensional graphics modification system 106 can provide a 3D representation that is rendered using one or more voxels (e.g., voxels having visual properties). For instance, the three-dimensional graphics modification system 106 can render one or more voxels collectively to create a 3D graphics object within a virtual reality environment. Although one or more embodiments herein describe the three-dimensional graphics modification system 106 displaying and modifying a voxel-based 3D representation within a virtual reality environment, the three-dimensional graphics modification system 106 can display and/or modify a voxel-based 3D representation in a variety of environments and/or spaces (e.g., a digital graphics modification workspace, etc.).

Furthermore, the three-dimensional graphics modification system 106 can provide a 3D digital brush tool that is a blur brush tool, a smudge brush tool, and/or a melt brush tool. Indeed, the three-dimensional graphics modification system 106 can provide user interface elements for selecting one or more of the blur brush tool, the smudge brush tool, and/or the melt brush tool (e.g., to modify one or more voxels with a blur effect, smudge effect, and/or a smoothing effect respectively). Moreover, the three-dimensional graphics modification system 106 can also provide user interface elements for selecting between one or more brush for the 3D digital brush tool styles (e.g., the segment that intersects with voxels) such as, but not limited to, a sphere, a cube, a pointer, etc. Additionally, the three-dimensional graphics modification system 106 can also provide user interface elements for selecting a brush size for the 3D digital brush tool (e.g., a larger brush size that intersects with a larger number of voxels compared to a smaller brush size that intersects with less voxels).

In one or more embodiments, the three-dimensional graphics modification system 106 detects one or more intersecting voxels with a 3D digital brush tool (e.g., voxels that intersect with a brush stroke of a user) and stores such voxels (and any associated visual property) to a buffer. Indeed, the three-dimensional graphics modification system 106 can utilize the buffer (in correspondence with one or more other buffers) to modify the voxels and, in turn, the 3D representation of the voxels in accordance with one or more embodiments herein. Moreover, the three-dimensional graphics modification system 106 can detect the one or more intersecting voxels during and/or after a brush stroke from the 3D digital brush tool (e.g., the three-dimensional graphics modification system 106 can include additional intersecting voxels as the brush stroke is updated).

Furthermore, the three-dimensional graphics modification system 106 can also determine a direction corresponding to the brush stroke of the 3D digital brush tool (e.g., the direction of travel of a brush stroke) and utilize the determined direction to modify one or more voxels (e.g., the smudge brush tool). Additionally, the three-dimensional graphics modification system 106 can also detect (or determine) an end of a brush stroke of the and update an octree corresponding to the one or more voxels (and/or intersected voxels) in accordance with one or more embodiments herein. Furthermore, the three-dimensional graphics modification system 106 can also include user interface elements for controlling a speed of diffusion (and/or other modifications) related to one or more voxels for the one or more brush modes (e.g., one or more effects).

As mentioned above, the three-dimensional graphics modification system 106 can modify voxels of a 3D representation using a 3D digital blur brush tool and/or a 3D smudge brush tool to provide a blur effect and/or a smudge effect to one or more voxels. For instance, the three-dimensional graphics modification system 106 can utilize two buffers of visual properties for one or more voxels to generate a rendering set of visual properties for the voxels that provide a blur and/or smudge effect. Indeed, the three-dimensional graphics modification system 106 can modify the one or more voxels to have a blur and smudge effect during and/or after a brush stroke interaction from a 3D digital blur brush tool and/or a 3D smudge brush tool (e.g., using a dynamic data structure update).

Figure 4A:
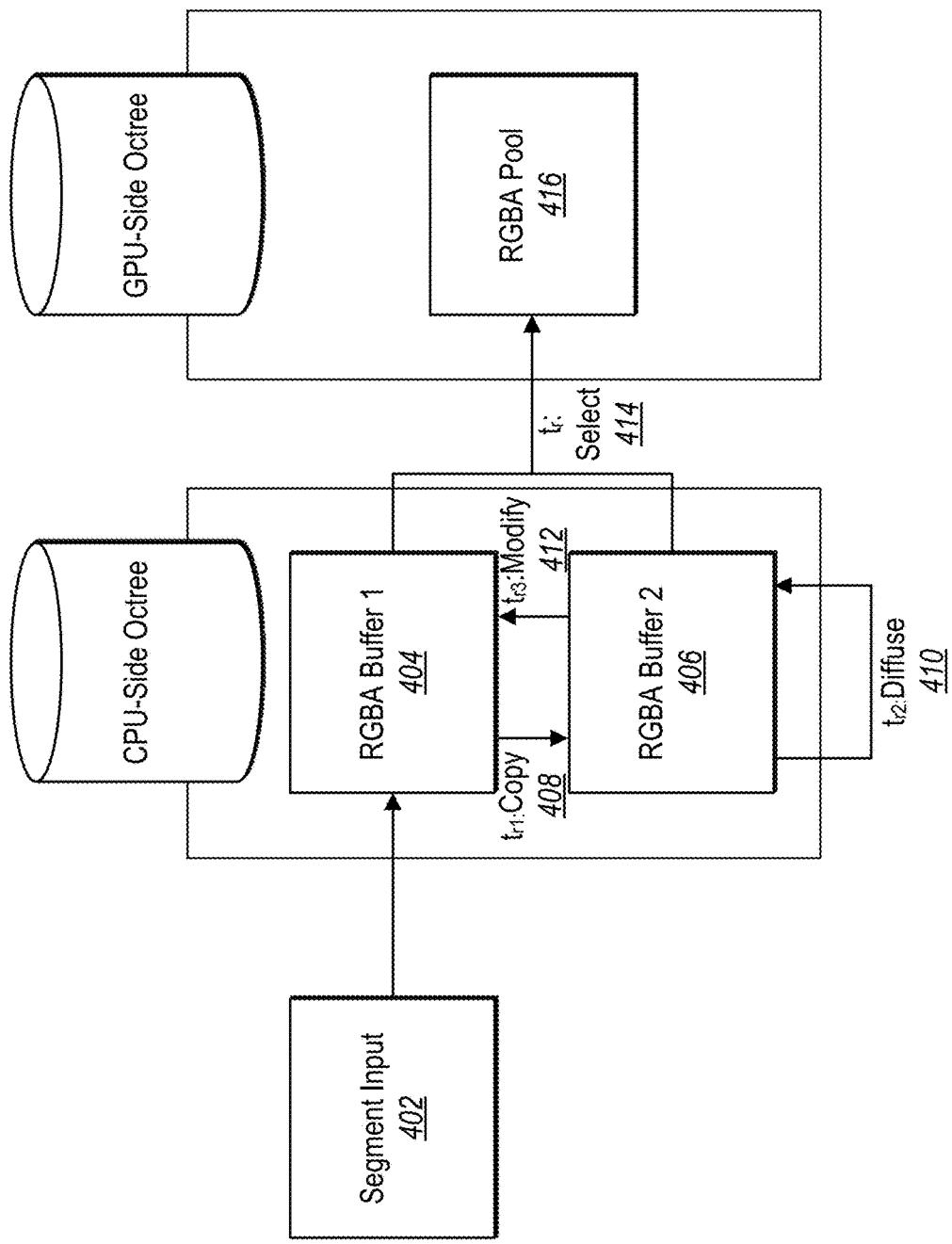
FIGS. 4A and 4B illustrate diagrams of a three-dimensional graphics modification system applying a blur effect and/or a smudge effect to one or more voxels in response to an interaction with a 3D digital brush tool in accordance with one or more embodiments.

For instance, FIG. 4A illustrates a diagram of the three-dimensional graphics modification system 106 applying a blur effect and/or a smudge effect to one or more voxels in response to an interaction with a 3D digital blur brush tool and/or a 3D smudge brush tool. In particular, as shown in FIG. 4A, the three-dimensional graphics modification system 106 receives (or identifies) one or more intersecting voxels from a segment input 402 (e.g., a segment input from a brush stroke of a 3D digital blur brush tool and/or a 3D smudge brush tool as described above). Then, as shown in FIG. 4A, the three-dimensional graphics modification system 106 generates (or utilizes) a first RGBA buffer 404 storing visual properties of the one or more voxels from the segment input 402 (e.g., on a CPU-side octree). Additionally, as illustrated in FIG. 4A, the three-dimensional graphics modification system 106 generates (or utilizes) a second RGBA buffer 406 by copying the visual properties of the one or more voxels from the first RGBA buffer 404 in an act 408 (e.g., on the CPU-side octree).

Moreover, as shown in FIG. 4A, the three-dimensional graphics modification system 106 modifies the visual properties of the one or more voxels of the second RGBA buffer 406 by performing a diffusion step in an act 410. In particular, the three-dimensional graphics modification system 106 diffuses colors and opacities of each voxel based on neighboring voxels. Indeed, in one or more embodiments, the three-dimensional graphics modification system 106 utilizes the diffused visual properties to portray a blur and/or smudge effect on a voxel-based 3D representation. In particular, as shown in FIG. 4A, the three-dimensional graphics modification system 106 modifies the first RGBA buffer 404 based on the diffused colors of the second RGBA buffer 406 in an act 412 (e.g., overwrites the colors of the first RGBA buffer 404 with the diffused colors of the second RGBA buffer 406).

Additionally, the three-dimensional graphics modification system 106 also generates a rendering set of visual properties (e.g., RGBA values) for the one or more voxels by selecting between visual properties for each voxel from the first RGBA buffer 404 and the second RGBA buffer 406 (based on whether the voxel is transparent in the second RGBA buffer 406 in an act 414). Indeed, as shown in FIG. 4A, the three-dimensional graphics modification system 106 utilizes the rendering set of visual properties (selected in the act 414) within the RGBA pool 416 (on the GPU-side octree) to render the one or more voxels with the modified visual properties (e.g., a blur effect and/or a smudge effect). In one or more embodiments, the three-dimensional graphics modification system 106 utilizes the RGBA pool 416 on the GPU-side octree to render modifications to one or more intersected voxels during an active brush stroke from a 3D digital blur brush and/or a 3D digital smudge brush (e.g., as a preview).

In some embodiments, the three-dimensional graphics modification system 106 utilizes a CPU-side octree and a GPU-side octree for voxel modification. In particular, the three-dimensional graphics modification system 106 utilizes an octree data structure to store one or more voxels of a 3D representation (e.g., a node or cell of an octree includes information for a voxel such as, but not limited to, visual properties, positioning, and/or voxel size). In one or more embodiments, the three-dimensional graphics modification system 106 traverses through the octree data structure to render one or more voxels for display (e.g., to display the 3D representation corresponding to the one or more voxels).

Additionally, in some embodiments, the three-dimensional graphics modification system 106 utilizes the CPU-side octree to perform modifications (e.g., an octree having the modifications of a brush stroke). Furthermore, in one or more embodiments, the three-dimensional graphics modification system 106 utilizes the GPU-side octree to render the one or more voxels with modifications during an active brush stroke (e.g., using a rendering set of visual properties for the one or more voxels). Indeed, the three-dimensional graphics modification system 106 can utilize a GPU-side octree to render modifications to one or more voxels for display during an active brush stroke and process the modifications to the one or more voxels on the CPU-side octree.

As mentioned above and in reference to FIG. 4A, the three-dimensional graphics modification system 106 can generate a first RGBA buffer 404 having visual properties of the one or more voxels from the segment input 402 (e.g., on a CPU-side octree). In particular, the three-dimensional graphics modification system 106 can utilize an RGBA buffer to access visual properties of one or more intersected voxels (e.g., from a brush stroke). Indeed, the first RGBA buffer 404 can include visual properties such as colors and opacities of the intersected voxels. Specifically, the three-dimensional graphics modification system 106 can utilize a canvas (or original) buffer (e.g., the first RGBA buffer 404) to store the original visual properties of one or more intersected voxels (e.g., from the segment input 402).

Additionally, in reference to FIG. 4A, the three-dimensional graphics modification system 106 can also generate a second RGBA buffer 406 having visual properties of the one or more voxels from the segment input 402 (e.g., on a CPU-side octree). More specifically, the three-dimensional graphics modification system 106 can generate a second RGBA buffer based on the voxels belonging to the first RGBA buffer 404. For instance, the three-dimensional graphics modification system 106 can copy the first RGBA buffer 404 to create the second RGBA buffer 406 (e.g., copy the RGBA values). In some embodiments, the three-dimensional graphics modification system 106 utilizes the second RGBA buffer 406 as a temporary space to modify one or more visual properties of voxels during a brush stroke.

Indeed, the three-dimensional graphics modification system 106 can utilize a first RGBA buffer 404 for the original visual properties of intersected voxels to preserve colors (and other properties) for diffusion of the one or more voxels (e.g., intersected voxels and/or neighboring voxels). For instance, by utilizing the first RGBA buffer 404 for the original visual properties and modifying the visual properties in a second RGBA buffer 406, the three-dimensional graphics modification system 106 can preserve visual properties to reference during the diffusion process. In particular, the three-dimensional graphics modification system 106 can reference original visual properties from the first RGBA buffer 404 in a diffusion process inasmuch as visual properties in the second RGBA buffer 406 are being modified during a diffusion process.

For example, as shown in FIG. 4A, the three-dimensional graphics modification system 106 can modify the visual properties of the one or more voxels in the second RGBA buffer 406 by performing a diffusion step in the act 410. In particular, the three-dimensional graphics modification system 106 modifies visual properties (e.g., color and opacity) of a voxel by diffusing the visual properties of the voxel based on neighboring voxels of the voxel (using original colors and alpha values from the first RGBA buffer 404). Indeed, as described in FIGS. 4C and 4D below, the three-dimensional graphics modification system 106 can cause a blur effect and/or a smudge effect based on the number and type of neighboring voxels utilized in the diffusion step (e.g., based on the selected brush type).

For example, the three-dimensional graphics modification system 106 can represent an averaged RGB and alpha value of a cell (e.g., from the octree) of a voxel as $C_p$ (for color) and $A_p$ (for alpha). Furthermore, the three-dimensional graphics modification system 106 can obtain visual properties for neighboring voxels and represent the visual properties as $C_n$ (for color) and $A_n$ (for alpha) for each $n^{th}$ neighboring voxel. Indeed, in one or more embodiments, the three-dimensional graphics modification system 106 utilizes neighboring voxels along the positive and/or negative X, Y, and/or Z direction of a voxel. Furthermore, the three-dimensional graphics modification system 106 can represent a diffusion coefficient as D. Then, the three-dimensional graphics modification system 106 can modify the visual properties of the voxel based on six neighboring voxels (e.g., for a blur effect) to obtain a diffused RGB $C_d$ and a diffused alpha $A_d$ for the voxel in accordance with the following:

$$A_d = A_p + D \times \sum_{n=1}^{6} (A_n - A_p)$$

and $$C_d = \frac{C_p + D \times \sum_{n=1}^{m} (C_n * A_n - C_p * A_p)}{A_d}$$

Moreover, as shown in FIG. 4A, the three-dimensional graphics modification system 106 can modify the first RGBA buffer 404 based on the diffused colors of the second RGBA buffer 406 in an act 412. In particular, in one or more embodiments, the three-dimensional graphics modification system 106 modifies (and/or overwrites) visual properties of the first RGBA buffer 404 using the diffused RGB $C_d$ and a diffused alpha $A_d$ for one or more voxels (as described above). For example, the three-dimensional graphics modification system 106 can utilize a diffused color for a voxel from the second RGBA buffer 406 to overwrite a color corresponding to the same voxel in the first RGBA buffer 404. Indeed, the three-dimensional graphics modification system 106 utilizes diffused colors from the second RGBA buffer 406 to overwrite colors in the first RGBA buffer 404 for each voxel in the RGBA buffers.

As mentioned above, the three-dimensional graphics modification system 106 can selectively overwrite values in the first RGBA buffer 404. In particular, the three-dimensional graphics modification system 106 can update color values in the first RGBA buffer 404 based on alpha values in the second RGBA buffer 406. Specifically, the three-dimensional graphics modification system 106 can utilize the diffused color for a voxel from the second RGBA buffer 406 to overwrite the color corresponding to the same voxel in the first RGBA buffer 404 when the voxel is not transparent in the second RGBA buffer 406 (e.g., when the second RGBA buffer 406 has an alpha value greater than 0).

In addition, as illustrated in FIG. 4A, the three-dimensional graphics modification system 106 generates a rendering set of visual properties from the first RGBA buffer and the second RGBA buffer. In particular, the three-dimensional graphics modification system 106 selects visual properties for each voxel from the first RGBA buffer 404 and the second RGBA buffer 406 based on the alpha value in the second RGBA buffer 406 (in an act 414). In particular, in one or more embodiments, the three-dimensional graphics modification system 106 determines whether a modified voxel (e.g., based on the diffusion process) is transparent within the second RGBA buffer and utilizes the diffused visual properties of a voxel from the second RGBA buffer if the voxel is not completely transparent within the second RGBA buffer. Otherwise, the three-dimensional graphics modification system 106 utilizes the visual properties of the voxel from the first RGBA buffer. Indeed, the three-dimensional graphics modification system 106 can utilize visual properties (e.g., RGBA values) of a voxel from the second RGBA buffer when the alpha value for the voxel is non-zero (e.g., greater than 0) and can otherwise utilize visual properties of the voxel from the first RGBA buffer.

In one or more embodiments, the three-dimensional graphics modification system 106 utilizes an opacity threshold to select visual properties for each voxel from the first RGBA buffer 404 and the second RGBA buffer 406 based on the alpha value in the second RGBA buffer 406 (in the act 414). For instance, the three-dimensional graphics modification system 106 can receive an opacity threshold value from a user input. Indeed, the three-dimensional graphics modification system 106 can utilize visual properties (e.g., RGBA values) of a voxel from the second RGBA buffer when the alpha value for the voxel meets the opacity threshold (e.g., greater than the opacity threshold) and can otherwise utilize visual properties of the voxel from the first RGBA buffer.

Furthermore, upon selecting (in an act 414) visual properties from between the first RGBA buffer 404 and the second RGBA buffer for one or more voxels to use in the RGBA pool 416, the three-dimensional graphics modification system 106 can render the voxels within the RGBA pool 416 (based on a GPU-side octree). In one or more embodiments, the three-dimensional graphics modification system 106 continually renders updates to the GPU-side octree. For example, referring to FIG. 4A, as visual properties (e.g., the RGBA value) is modified and selected for a voxel (e.g., placed in a rendering set), the three-dimensional graphics modification system 106 can render the voxel with the selected visual properties for display (e.g., from the rendering set in the RGBA pool 416) on the GPU-side octree.

Indeed, the three-dimensional graphics modification system 106 can render the voxel on the GPU-side octree (e.g., based on the rendering set of visual properties) at any point in time (e.g., while a user is interacting with a brush tool, the three-dimensional graphics modification system 106 is actively receiving a brush stroke, and/or the completion of a brush stroke). As such, the three-dimensional graphics modification system 106 can render while receiving input (e.g., segment information from a brush tool), diffusing one or more voxels, overwriting the first RGBA buffer 404, etc. Thus, the three-dimensional graphics modification system 106 can select visual properties for one or more voxels from the first RGBA buffer 404 or the second RGBA buffer 406 based on the opacity values of the second RGBA buffer 406 at any point in time.

Accordingly, the three-dimensional graphics modification system 106 can modify and select visual properties for each intersecting voxel in a rendering set and render for the visual properties belonging to the rendering set for display. By doing so, the three-dimensional graphics modification system 106 can display modifications to regions of a 3D representation corresponding to one or more intersecting voxels when a user draws a brush stroke with a 3D digital brush tool (e.g., actively render modifications to the voxels during the brush stroke). Indeed, the three-dimensional graphics modification system 106 causes the modified voxels to portray a blur and/or smudge effect in comparison to their original visual properties when rendered using the diffusion process and the selection between two buffers as described above.

Figure 4B:
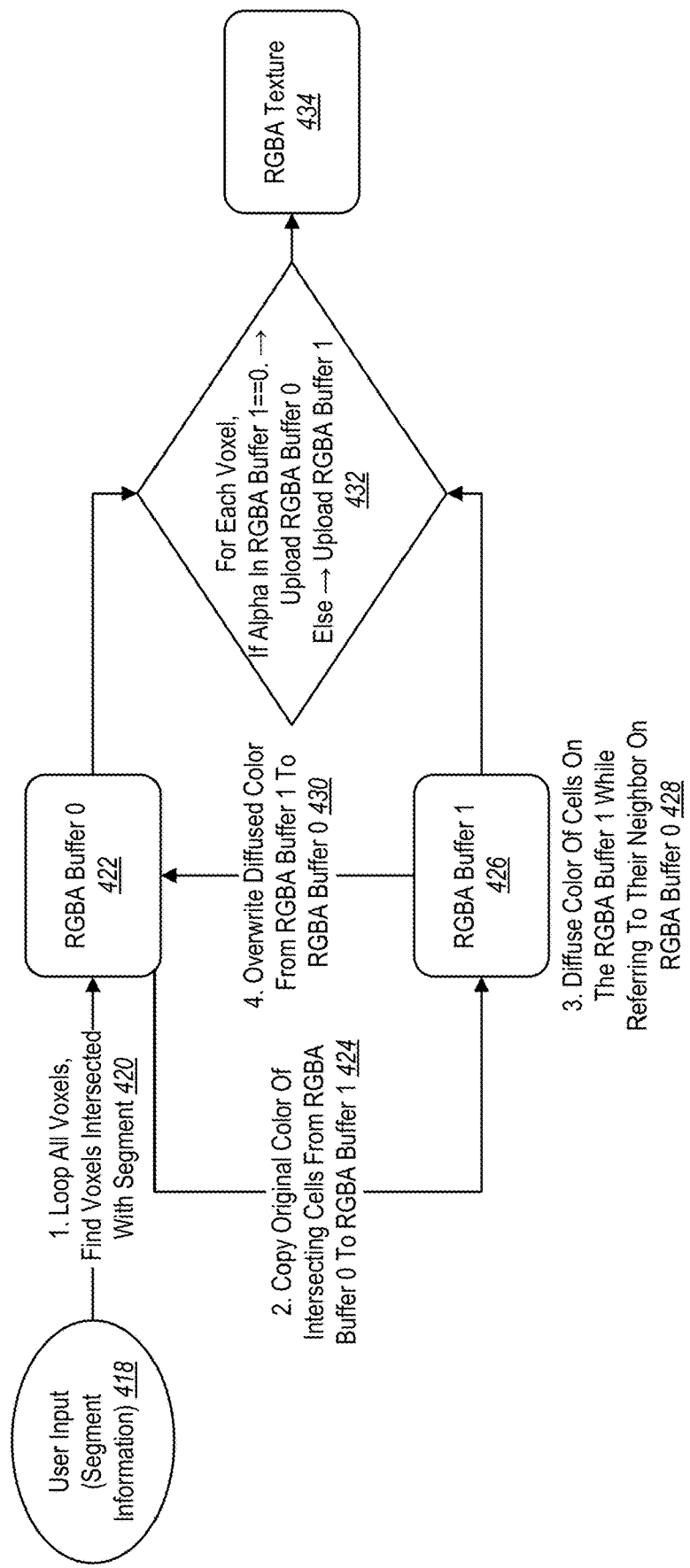

Furthermore, the three-dimensional graphics modification system 106 can update and/or render one or more voxels with a blur effect and/or smudge effect in accordance with the flow diagram illustrated in FIG. 4B. For instance, as shown in FIG. 4B, the three-dimensional graphics modification system 106 receives user input 418 by looping all voxels (to find voxels intersected with a segment) in an act 420. Then, as shown in FIG. 4B, the three-dimensional graphics modification system 106 generates a first RGBA buffer 422 (e.g., having visual properties of the voxels from user input 418). Moreover, as illustrated in FIG. 4B, the three-dimensional graphics modification system 106 also copies original colors (and/or alphas) of intersected cells (e.g., voxels) from the first RGBA buffer 422 to a second RGBA buffer 426 in an act 424 (e.g., to generate the second RGBA buffer 426). Additionally, as illustrated in FIG. 4B, the three-dimensional graphics modification system 106 diffuses color of the cells on the second RGBA buffer 426 while referring color of their neighbor (e.g., neighboring voxels) on the first RGBA buffer 422 in an act 428.

Furthermore, as shown in FIG. 4B, the three-dimensional graphics modification system 106 overwrites diffused color (or colors) from the second RGBA buffer 426 to the first RGBA buffer 422 in an act 430 (e.g., on a CPU-side octree). Moreover, as shown in FIG. 4B, the three-dimensional graphics modification system 106 generates a rendering set of visual properties for the voxels (e.g., of user input 418) in a RGBA pool 434 (e.g., RGBA texture on a GPU-side octree). For instance, as shown in FIG. 4B, the three-dimensional graphics modification system 106 uploads the RGBA values of a voxel from the first RGBA buffer 422 if alpha in the second RGBA buffer 426 is equal to zero for the voxel in an act 432 (e.g., on a GPU-side octree). Otherwise, as shown in FIG. 4B, the three-dimensional graphics modification system 106 uploads the RGBA values of the voxel from the second RGBA buffer 426 in the act 432 (e.g., on a GPU-side octree).

Figure 5A:
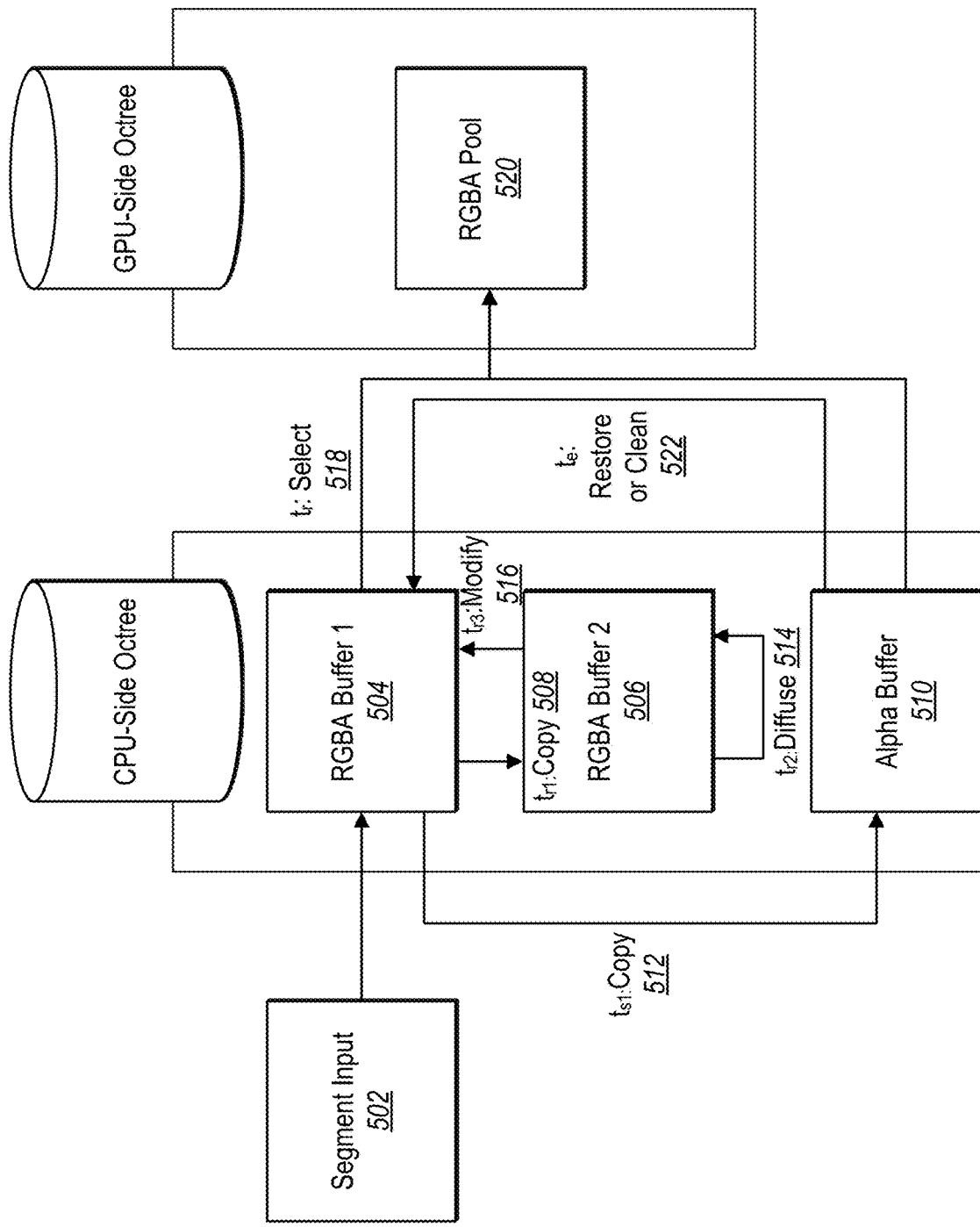
FIGS. 5A-5C illustrate diagrams of a three-dimensional graphics modification system applying a melt effect to one or more voxels in response to an interaction with a 3D digital brush tool in accordance with one or more embodiments.
Figure 5B:
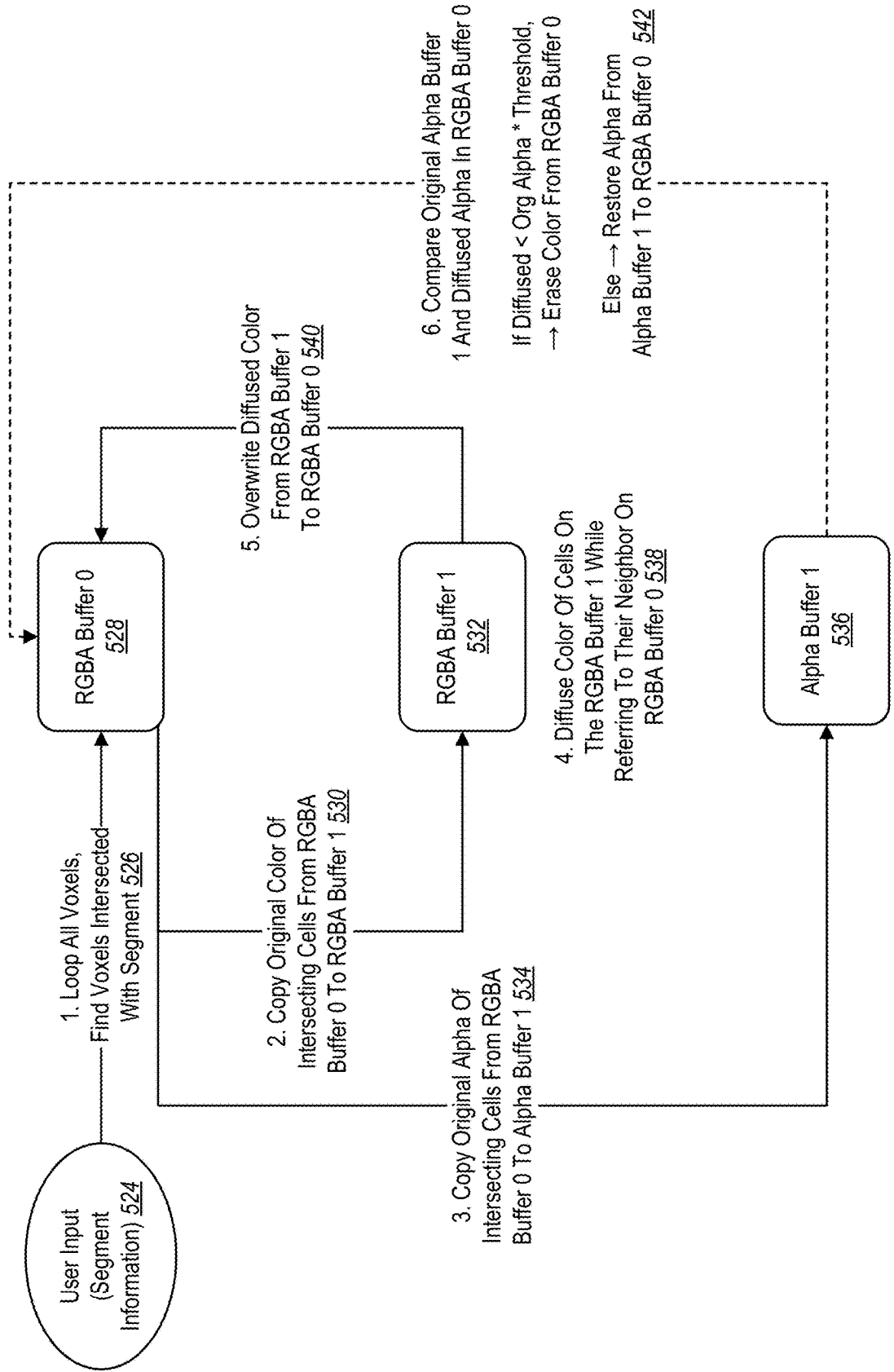
Figure 5C:
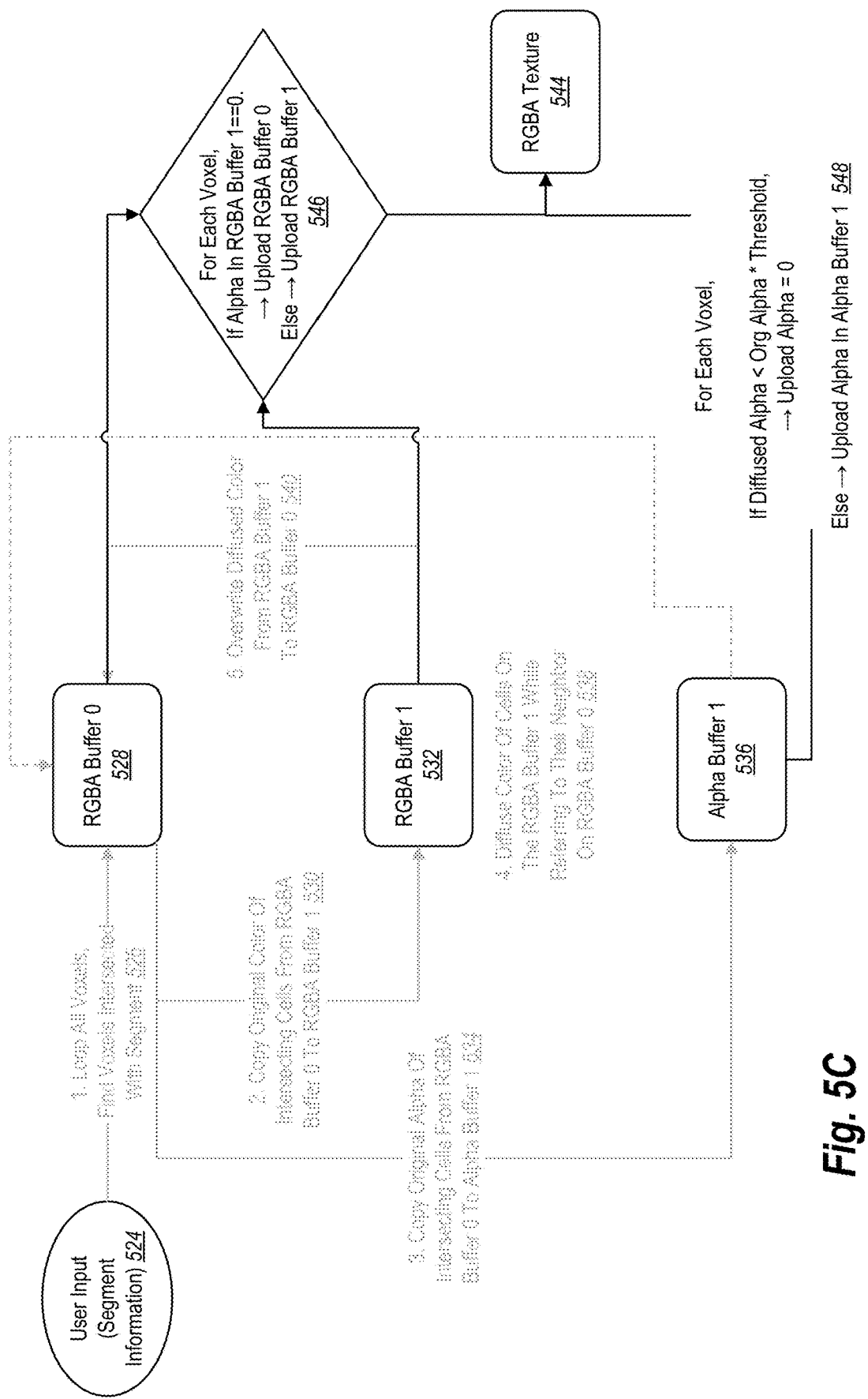
Figure 5D:
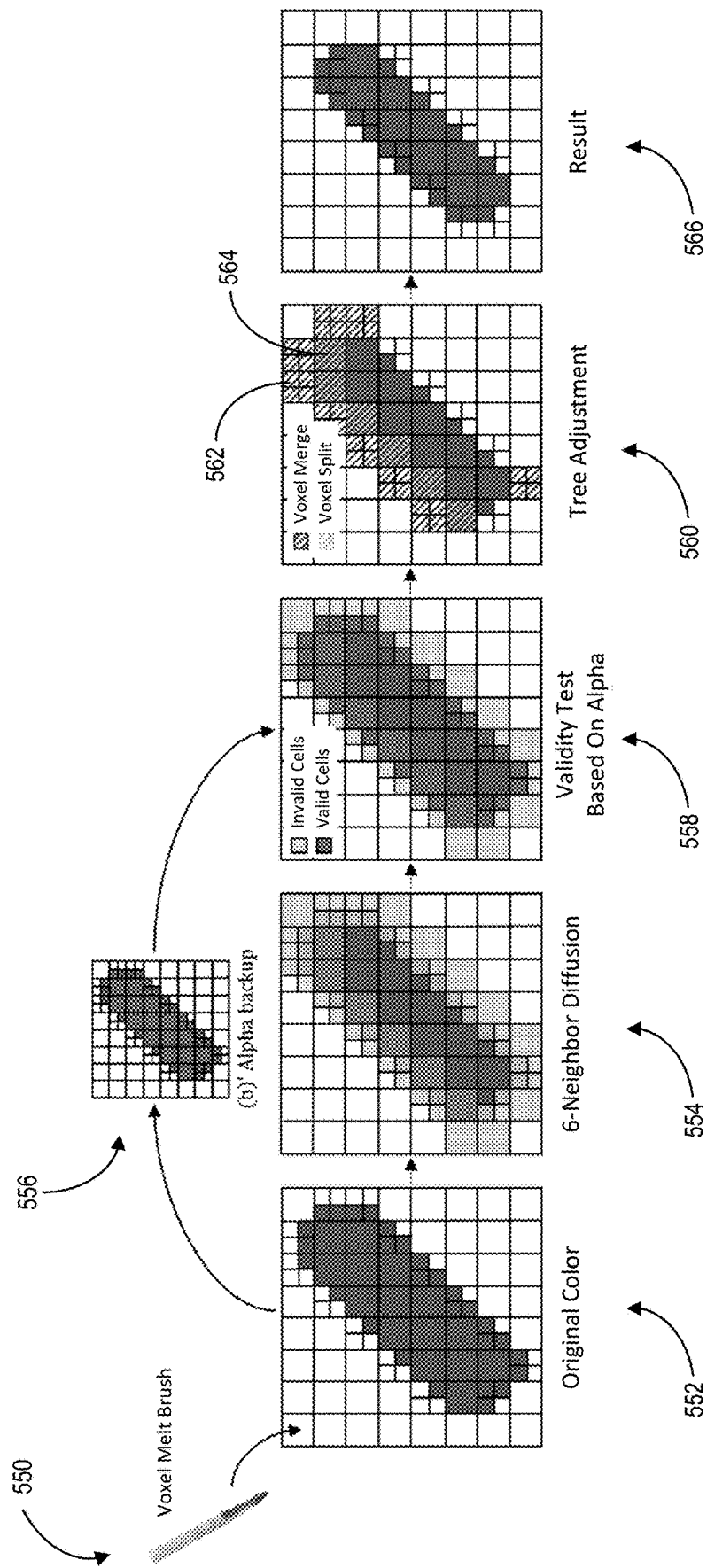
FIG. 5D illustrates a three-dimensional graphics modification system utilizing voxel merging and voxel splitting to further refine one or more voxels as part of a digital melt brush operation in accordance with one or more embodiments.

Additionally, the three-dimensional graphics modification system 106 can also adjust voxel sizes of one or more intersected voxels when applying a 3D blur brush tool and/or 3D smudge brush tool (e.g., as described in greater detail in FIG. 5D). For instance, upon applying a 3D blur effect and/or 3D smudge effect on one or more voxels, the three-dimensional graphics modification system 106 can split and/or merge voxels from the one or more voxels based on the opacity values of the voxels. As an example, the three-dimensional graphics modification system 106 can merge one or more voxels that are identified to be transparent (e.g., voxels that correspond to the same parent voxel within an octree and have become transparent) after applying a 3D blur effect and/or 3D smudge effect. In some embodiments, the three-dimensional graphics modification system 106 can split one or more voxels based on a desired size (e.g., a size based on a view-dependent scale) and/or opacity values of the one or more voxels (e.g., to apply smooth changes in the alpha values for the voxels upon applying a 3D blur and/or 3D smudge effect).

Although, one or more embodiments herein describe the three-dimensional graphics modification system 106 utilizing a buffer, the three-dimensional graphics modification system 106 can utilize other methods to preserve the visual properties of the one or more voxels. In particular, the three-dimensional graphics modification system 106 can utilize multiple data sets corresponding to visual properties of intersected voxels (e.g., a first data set and a second data set of visual properties of intersected voxels). For instance, the three-dimensional graphics modification system 106 can utilize a first data set having original visual properties of intersected voxels and copy (and/or) modify the visual properties of the intersected voxels within a second data set. Furthermore, although one or more embodiments describe an RGBA buffer, the three-dimensional graphics modification system 106 can utilize buffers (or other methods) having various types of visual properties (e.g., HSV, CIELAB, etc.).

As previously mentioned, the three-dimensional graphics modification system 106 can perform the process described above to modify a voxel-based 3D representation with a blur effect. In particular, the three-dimensional graphics modification system 106 can utilize a 3D digital blur brush tool (e.g., to capture one or more intersected voxels within an input segment of the blur brush tool) and modify the intersected voxels in accordance with one or more embodiments herein. For example, FIG. 4C illustrates an example of a 3D blur effect on one or more voxels.

In particular, as shown in FIG. 4C, the three-dimensional graphics modification system 106 can display a voxel 436 having visual properties (e.g., color and opacity). Then, upon receiving the voxel 436 as an input within a 3D digital blur brush tool, the three-dimensional graphics modification system 106 can modify the voxel by diffusing the visual properties based on neighboring voxels (e.g., six neighboring voxels) in accordance with one or more embodiments herein. For example, as shown in FIG. 4C, the three-dimensional graphics modification system 106 can modify the voxel 436 to have blurred visual properties (e.g., a blurred color and/or opacity) as shown by a front view 438 of a blurred voxel and a top view 440 of the blurred voxel (e.g., the blurred voxel in the front view 438 and top view 440 represents a volumetric 3D structure).

Furthermore, the three-dimensional graphics modification system 106 can perform the process described above to modify a voxel-based 3D representation with a smudge effect. More specifically, the three-dimensional graphics modification system 106 can utilize a 3D digital smudge brush tool (e.g., to capture one or more intersected voxels within an input segment of the smudge brush tool) and modify the intersected voxels in accordance with one or more embodiments herein. For example, FIG. 4D illustrates an example of a 3D smudge effect on one or more voxels.

In particular, as shown in FIG. 4D, the three-dimensional graphics modification system 106 can display a voxel 442 having visual properties. Additionally, upon receiving the voxel 442 as an input within a 3D digital smudge brush tool, the three-dimensional graphics modification system 106 can modify the voxel by diffusing the visual properties based on neighboring voxels based on a brush stroke direction in accordance with one or more embodiments herein. For example, as shown in FIG. 4D, the three-dimensional graphics modification system 106 can modify the voxel 442 to have smudged visual properties (e.g., a smudged color and/or opacity) as shown by a front view 444 of smudged voxel and a top view 446 of the smudged voxel (e.g., the smudged voxel in the front view 444 and top view 446 represents a volumetric 3D structure).

For instance, the three-dimensional graphics modification system 106 modifies a voxel by performing a diffusion step (as described above) utilizing neighboring voxels based on a detected direction of a brush stroke to cause the smudge effect. In particular, the three-dimensional graphics modification system 106 can detect a direction of travel corresponding to an input brush stroke for a 3D digital smudge brush tool (e.g., using X, Y, and Z coordinates corresponding to the movement of the 3D digital smudge brush tool). Moreover, the three-dimensional graphics modification system 106 can determine neighboring voxels that are adjacent to a voxel opposite of the direction of travel of the brush stroke. Then, the three-dimensional graphics modification system 106 can utilize the nearest neighbors of a voxel that are opposite of the direction of travel of the brush stroke to modify the voxel with a smudge effect (e.g., diffusing the visual properties of the voxel in the direction of travel of the brush stroke). For example, the three-dimensional graphics modification system 106 can modify the visual properties of the voxel based on the nearest three neighboring voxels that are positioned opposite to the direction of travel of a brush stroke to cause a smudge effect on the voxel.

Indeed, the three-dimensional graphics modification system 106 can modify visual properties of one or more voxels by distorting the voxels in the direction of travel of a brush stroke based on neighboring voxels that are opposite of the direction of travel of the brush stroke. Furthermore, the three-dimensional graphics modification system 106 can utilize the visual properties of the one or more voxels in a rendering set of visual properties to render the voxels with a smudge effect in accordance with one or more embodiments. Although one or more embodiments herein describe the three-dimensional graphics modification system 106 utilizing a specific number of neighboring voxels to modify a voxel, the three-dimensional graphics modification system 106 can utilize other numbers of neighboring voxels (e.g., fewer than 6 voxels, such as 1, 2, or 4 neighboring voxels).

As mentioned above, the three-dimensional graphics modification system 106 can modify one or more voxels of a 3D representation using a 3D digital melt brush tool to provide a smoothing effect to the one or more voxels. For example, the three-dimensional graphics modification system 106 can utilize three buffers of visual properties for one or more voxels to generate a rendering set of visual properties for the voxels that provide a smoothing effect. Indeed, the three-dimensional graphics modification system 106 can modify the one or more voxels by smoothing the voxels during and/or after a brush stroke interaction from a 3D digital melt brush tool.

For instance, the three-dimensional graphics modification system 106 can utilize a 3D digital melt brush tool (e.g., a voxel-refining brush tool) to smooth 3D representations by removing color, splitting large voxels into smaller voxels, and coloring split voxels. Indeed, similar to the 3D digital blur brush tool and the 3D digital smudge brush tool, the three-dimensional graphics modification system 106 utilizes the 3D digital melt brush tool to diffuse color in one or more voxels. In addition to diffusing color, the three-dimensional graphics modification system 106 determines the final color from the original color based on an alpha validity test (as described below) to determine the existence of color in a voxel while smoothing one or more voxels in a 3D representation.

For example, FIG. 5A illustrates a diagram of the three-dimensional graphics modification system 106 modifying one or more voxels by smoothing the voxels (e.g., a melt effect). More specifically, as shown in FIG. 5A, the three-dimensional graphics modification system 106 receives one or more intersecting voxels from a segment input 502 (e.g., a segment input from a brush stroke of a 3D digital melt brush tool as described above). Furthermore, as shown in FIG. 5A, the three-dimensional graphics modification system 106 generates a first RGBA buffer 504 having visual properties of the one or more voxels from the segment input 502 (e.g., on a CPU-side octree). Then, as illustrated in FIG. 5A, the three-dimensional graphics modification system 106 generates a second RGBA buffer 506 by copying the visual properties of the one or more voxels from the first RGBA buffer 504 in an act 508 (e.g., in accordance with one or more embodiments herein).

Additionally, as shown in FIG. 5A, the three-dimensional graphics modification system 106 also generates an alpha buffer 510 by copying the visual properties of the one or more voxels from the first RGBA buffer 504 in an act 512. Moreover, as shown in FIG. 5A, the three-dimensional graphics modification system 106 modifies the visual properties of the one or more voxels of the second RGBA buffer 506 by performing a diffusion act using neighboring voxels in the positive and/or negative X, Y, and/or Z direction in an act 514 (e.g., in accordance with one or more embodiments herein). Then, as illustrated in FIG. 5, the three-dimensional graphics modification system 106 modifies the first RGBA buffer 504 based on the diffused colors of the second RGBA buffer 506 in an act 516 (e.g., in accordance with one or more embodiments herein).

Furthermore, the three-dimensional graphics modification system 106 generates a rendering set of visual properties (e.g., RGBA values) for the one or more voxels by selecting between colors for each voxel from the first RGBA buffer 504 and the second RGBA buffer 506 based on whether the voxel is transparent in the second RGBA buffer 506 in an act 518. More particularly, the three-dimensional graphics modification system 106 can perform an alpha validity test as part of the act 518. For instance, as shown in FIG. 5A, the three-dimensional graphics modification system 106 selects between complete transparency (e.g., an alpha value of 0) or an original opacity (e.g., from the alpha buffer 510) for a voxel in the act 518 based on the alpha validity test. In particular, the three-dimensional graphics modification system 106 performs the alpha validity test by comparing a diffused opacity (e.g., from the second RGBA buffer 506 or the second RGBA buffer 506) to the original opacity (from the alpha buffer 510) to determine whether to use complete transparency or the original opacity for the voxel. Indeed, in one or more embodiments, the three-dimensional graphics modification system 106 selects, for the rendering set of visual properties, an alpha value of zero (e.g., complete transparency) when the diffused opacity does not meet an alpha validity threshold and otherwise selects the original opacity.

Furthermore, as shown in FIG. 5A, the three-dimensional graphics modification system 106 utilizes the rendering set of visual properties (selected in the act 518) within the RGBA pool 520 (on the GPU-side octree) to render the one or more voxels with the modified visual properties (e.g., the diffused colors and modified opacities). In one or more embodiments, the three-dimensional graphics modification system 106 utilizes the RGBA pool 520 on the GPU-side octree to render modifications to one or more intersected voxels during an active brush stroke from a 3D digital melt brush tool (e.g., as a preview). Indeed, by creating a rendering set of visual properties with an alpha value of zero (e.g., complete transparency) and/or the original opacity of the voxel, the three-dimensional graphics modification system 106 can remove some voxels from display to effectuate a melting effect (e.g., one or more voxels are removed from a 3D representation) during and/or after a brush stroke (e.g., using a dynamic data structure update).

Furthermore, as shown in FIG. 5A, the three-dimensional graphics modification system 106 also restores and/or cleans visual properties belonging to the first RGBA buffer per brush stroke (e.g., after completion of a brush stroke) in an act 522. In particular, the three-dimensional graphics modification system 106 can perform an additional alpha validity test to restore or clean colors from the first RGBA buffer 504. Specifically, the three-dimensional graphics modification system 106 compares a diffused opacity (e.g., from the second RGBA buffer 506) to the original opacity from the alpha buffer 510 for a voxel to determine whether to erase the color or utilize the original color for the voxel (on the CPU-side octree) in an act 522 (e.g., an alpha validity test). Indeed, in one or more embodiments, the three-dimensional graphics modification system 106 erases the color of the voxel from the octree when the diffused opacity does not meet a threshold opacity value (e.g., when the voxel is substantially transparent) in the act 522. Otherwise the three-dimensional graphics modification system 106 utilizes the existing color in the first RGBA buffer 504 and the original alpha (e.g., from the alpha buffer 510) within the octree in the act 522.

As illustrated in FIG. 5A, the three-dimensional graphics modification system 106 utilizes an alpha buffer as a temporary space to preserve the original opacity properties of voxels. In particular, in some embodiments, the three-dimensional graphics modification system 106 utilizes a final opacity for a voxel from the original opacity of the voxel based on an alpha validity test. For instance, the three-dimensional graphics modification system 106 decides whether to remove a voxel and/or preserve the voxel with the voxel's original opacity based on whether performing a diffusion on the visual properties of a voxel leads the voxel to have a diffused alpha that is substantially transparent (e.g., based on a threshold opacity). Indeed, the three-dimensional graphics modification system 106 can utilize three RGBA buffers (as described below and in FIG. 5A) in order to preserve color during an active brush stroke such that diffusion for one or more voxels is not affected by removed voxels and to smooth the one or more voxels after the diffusion act.

As mentioned above, in some embodiments, the three-dimensional graphics modification system 106 can perform an alpha validity test by comparing a diffused alpha value of a voxel to an alpha validity threshold. In one or more embodiments, the three-dimensional graphics modification system 106 determines the alpha validity threshold by multiplying the original alpha value of a voxel by a threshold number (e.g., a number between 0 and 1). Then, the three-dimensional graphics modification system 106 determines whether the diffused alpha value of the voxel is less than the alpha validity threshold. For instance, when the diffused alpha value is less than the alpha validity threshold, the three-dimensional graphics modification system 106 utilizes an alpha value of zero for the voxel in the rendering set of visual properties (e.g., causing the voxel to be transparent and being perceived as erased during the brush stroke). Otherwise, the three-dimensional graphics modification system 106 utilizes the original alpha value from the alpha buffer as the alpha value for the voxel in the rendering set.

For instance, the three-dimensional graphics modification system 106 can represent a diffused opacity as $A_d$ and an original opacity as $A_p$ for a voxel. Additionally, the three-dimensional graphics modification system 106 can represent a validity of a voxel (e.g., whether to set alpha to zero while rendering, restore and/or erase color, and/or determine validity for splitting and merging in a tree-adjustment act) as $A_m$. Then, the three-dimensional graphics modification system 106 can determine the validity of a voxel using the following:

$$A_m = \begin{cases} A_p & \text{if } (A_d \geq A_p * \text{threshold}) \\ 0 & \text{if } (A_d < A_p * \text{threshold}) \end{cases}$$

Indeed, in one or more embodiments, the three-dimensional graphics modification system 106 receives the threshold number from a user as part of a configuration for the 3D digital melt brush tool. Indeed, the three-dimensional graphics modification system 106 can receive a lower threshold number (e.g., 0.1) and, as a result, utilize an alpha value of 0 for a voxel when the diffused value is less than the lower alpha validity threshold (e.g., $A_p$*threshold) calculated by the lower threshold number (e.g., less voxels are assigned an alpha value of 0). Furthermore, the three-dimensional graphics modification system 106 can also receive a higher threshold number (e.g., 0.7) and, as a result, utilize an alpha value of 0 for a voxel when the diffused value is less than the higher alpha validity threshold calculated by the higher threshold number (e.g., more voxels are assigned an alpha value of 0). In some embodiments, the three-dimensional graphics modification system 106 utilizes a predetermined threshold number (e.g., set by a developer and/or administrator of the three-dimensional graphics modification system 106).

For instance, by selecting between an alpha value of 0 and an original alpha value for the rendering set of visual properties (e.g., on the GPU-side octree) using the alpha validity test as described above, the three-dimensional graphics modification system 106 can render a preview of a melt effect without actually erasing color properties of the one or more voxels (e.g., by causing the voxels to be transparent via the alpha values). As such, the three-dimensional graphics modification system 106 can perform additional modifications in response to an active brush stroke for additional intersecting voxels because colors are preserved for the previously smoothed voxels in the brush stroke to perform a diffusion act on the additional intersecting voxels (e.g., transparent voxels). Indeed, the three-dimensional graphics modification system 106 can render the rendering set of visual properties during an active brush stroke to preview the smoothing effect on one or more intersecting voxels (e.g., removing one or more voxels by setting their alpha value to zero) while modifying additional intersecting voxels in accordance with one or more embodiments herein.

Moreover, the three-dimensional graphics modification system 106 can update (e.g., on a CPU-side octree) one or more voxels with a smoothing effect in accordance with the flow diagram illustrated in FIG. 5B. In particular, as shown in FIG. 5B, the three-dimensional graphics modification system 106 receives user input 524 by looping all voxels (to find voxels intersected with a segment) in an act 526. Then, as shown in FIG. 5B, the three-dimensional graphics modification system 106 generates a first RGBA buffer 528 (e.g., having visual properties of the voxels from user input 524). Moreover, as illustrated in FIG. 5B, the three-dimensional graphics modification system 106 also copies original colors (and/or alphas) of intersected cells (e.g., voxels) from the first RGBA buffer 528 to a second RGBA buffer 532 in an act 530 (e.g., to generate the second RGBA buffer 532). Furthermore, as shown in FIG. 5B, the three-dimensional graphics modification system 106 copies original alphas of intersected cells from the first RGBA buffer 528 to an alpha buffer 536 in an act 534 (to generate the alpha buffer 536).

Additionally, as illustrated in FIG. 5B, the three-dimensional graphics modification system 106 diffuses color of the cells on the second RGBA buffer 532 while referring color of their neighbor (e.g., neighboring voxels) on the first RGBA buffer 528 in an act 538. In addition, as shown in FIG. 5B, the three-dimensional graphics modification system 106 overwrites diffused color (or colors) from the second RGBA buffer 532 to the first RGBA buffer 528 in an act 540 (e.g., on a CPU-side octree). Additionally, as shown in FIG. 5B, the three-dimensional graphics modification system 106 performs updates per stroke operation in an act 542 (e.g., on a CPU-side octree). In particular, as shown in FIG. 5B, the three-dimensional graphics modification system 106 compares an original alpha in the alpha buffer 536 and a diffused alpha in the first RGBA buffer 528 (e.g., for a voxel) in the act 542. For instance, as shown in FIG. 5B, the three-dimensional graphics modification system 106 erases color from the first RGBA buffer 528 (e.g., for the voxel) if the diffused alpha is less than an alpha validity threshold (e.g., an original alpha multiplied by a threshold number) in the act 542. Furthermore, as shown in FIG. 5B, the three-dimensional graphics modification system 106 otherwise restores alpha from the alpha buffer 536 to the first RGBA buffer 528 (e.g., for the voxel) in the act 542.

Moreover, the three-dimensional graphics modification system 106 can render (e.g., on a GPU-side octree) one or more voxels with a smoothing effect in accordance with the flow diagram illustrated in FIG. 5C. For instance, as shown in FIG. 5C, the three-dimensional graphics modification system 106 modifies (and/or updates) the first RGBA buffer 528, the second RGBA buffer 532, and the alpha buffer 536 as described above in FIG. 5B. Additionally, as shown in FIG. 5C, the three-dimensional graphics modification system 106 uploads RGB (e.g., for a voxel) from the first RGBA buffer 528 if alpha in the second RGBA buffer 532 is equal to zero in an act 546 for rendering in a RGBA pool 544 (e.g., RGBA texture) to render the RGB value (e.g., on a GPU-side octree). Otherwise, as illustrated in FIG. 5C, the three-dimensional graphics modification system 106 uploads RGB from the second RGBA buffer 532 in the act 546 for rendering in the RGBA pool 544 to render the RGB value (e.g., on a GPU-side octree).

In addition, as shown in FIG. 5C, the three-dimensional graphics modification system 106 also performs an alpha validity test in an act 548. For instance, as illustrated in FIG. 5C, the three-dimensional graphics modification system 106 uploads (e.g., to the RGBA pool 544) an alpha of zero if a diffused alpha (e.g., for a voxel) is less than an alpha validity threshold (e.g., an original alpha multiplied by a threshold number) in the act 548 (e.g., on a GPU-side octree). Additionally, as shown in FIG. 5C, the three-dimensional graphics modification system 106 otherwise uploads alpha from the alpha buffer 536 to the RGBA pool 544 (e.g., for the voxel) in the act 548 (e.g., on a GPU-side octree). As mentioned above, the three-dimensional graphics modification system 106 can render and/or update one or more voxels using the processes described in FIGS. 5B and 5C iteratively, at any point in time, and/or at the same time.

Furthermore, the three-dimensional graphics modification system 106 can perform octree adjustments after modifying voxels using an alpha validity test to further modify intersecting voxels in a digital melt brush operation. In particular, the three-dimensional graphics modification system 106 can merge and/or split voxels based on rendered colors of one or more voxels to further smooth the voxels in a digital melt brush operation. For instance, FIG. 5D illustrates the three-dimensional graphics modification system 106 utilizing voxel merging and voxel splitting to further refine (or coarsen) one or more voxels within a digital melt brush operation.

In particular, as shown in FIG. 5D, the three-dimensional graphics modification system 106 receives an input segment of voxels from a digital melt brush tool interaction 550 and can retrieve the original color values in an act 552 for the voxels (e.g., a first buffer of visual properties) in accordance with one or more embodiments herein. Moreover, as illustrated in FIG. 5D, the three-dimensional graphics modification system 106 can modify the voxels to obtain diffused color values in an act 554 for the voxels (e.g., in a second buffer of visual properties) in accordance with one or more embodiments herein. Additionally, as shown in FIG. 5D, the three-dimensional graphics modification system 106 can also copy the color values in the act 552 to obtain an alpha backup in an act 556 (e.g., an alpha buffer) in accordance with one or more embodiments herein.

Furthermore, as shown in FIG. 5D, the three-dimensional graphics modification system 106 can utilize an alpha validity test based on a comparison of alpha values of the voxels (as described above) to identify valid cells and invalid cells for the voxels in an act 558. Indeed, in reference to FIG. 5D, the three-dimensional graphics modification system 106 can identify voxels that have an erased color (as described above in the act 522) as invalid cells in an octree. Moreover, in reference to FIG. 5D, the three-dimensional graphics modification system 106 can identify voxels that have a restored color (as described above in the act 522) as valid cells in the octree. Then, as shown in FIG. 5D, upon identifying valid and invalid cell for the voxels in the act 558, the three-dimensional graphics modification system 106 can split and/or merge voxels within the octree based on the color properties of the valid and invalid cells in an act 560.

In particular, the three-dimensional graphics modification system 106 determines a desired size of a cell with a view-dependent scale. For example, the view of a user within the 3D space displaying the voxels determines a desired size (e.g., zooming in corresponds to smaller voxel sizes and zooming out corresponds to larger voxel sizes). In one or more embodiments, the three-dimensional graphics modification system 106 automatically controls the resolution of voxels according to a view scale for a 3D digital brush tool. In some embodiments, the three-dimensional graphics modification system 106 can receive input from a user to configure (or control) the scale factor (e.g., desired size) to control the resolution of voxels during the melt brush operation and/or a tree adjustment operation (e.g., the splitting and or merging of voxels). In particular, the three-dimensional graphics modification system 106 can receive a desired size for the melt brush operation (e.g., to control the amount of voxel modification in terms of voxel size) to utilize during the melt brush operation and/or the tree adjustment operation (as described below).

Furthermore, as shown in FIG. 5D, the three-dimensional graphics modification system 106 merges (or combines) one or more cells (or voxels) corresponding to the determined invalid cells in the act 560. In one or more embodiments, the three-dimensional graphics modification system 106 merges the one or more cells based on color values of sibling cells (e.g., within an octree) of the invalid cell. For example, the three-dimensional graphics modification system 106 merges the one or more cells if all of the sibling cells (e.g., within an octree) of the invalid cell have no color (e.g., erased color values and/or non-existent color values).

Moreover, as illustrated in FIG. 5D, the three-dimensional graphics modification system 106 splits one or more cells (or voxels) corresponding to the determined valid cells in the act 560. In some embodiments, the three-dimensional graphics modification system 106 splits the one or more cells based on the size of voxel within the cell. Indeed, the three-dimensional graphics modification system 106 can split a voxel corresponding to a cell that is bigger than a desired size of voxels (e.g., based on the view-dependent scale). In particular, the three-dimensional graphics modification system 106 generates children for the valid cells in the act 560 (e.g., children nodes within the octree for the valid voxels).

As an example, as shown in FIG. 5D, the three-dimensional graphics modification system 106 merges cells 562. Indeed, as illustrated in FIG. 5D, the three-dimensional graphics modification system 106 can identify the cells 562 as having invalid cells (e.g., predominantly invalid cells) in accordance with one or more embodiments. As shown in FIG. 5D, the cells 562 include invalid cells that are colorless (e.g., voxels that are transparent and/or colorless). As such, the three-dimensional graphics modification system 106 can merge the cells 562 (e.g., four cells corresponding to four voxels) into a single colorless cell (e.g., a single merged voxel) as shown in the act 566.

Furthermore, as illustrated in FIG. 5D, the three-dimensional graphics modification system 106 splits cell 564. In particular, as shown in FIG. 5D, the three-dimensional graphics modification system 106 can identify the cell 564 as a valid cell in accordance with one or more embodiments. Moreover, as illustrated in FIG. 5D, the cell 564 includes a valid cell that has visual properties (e.g., a voxel that is not transparent and/or colorless). As such, the three-dimensional graphics modification system 106 can split the cell 564 (e.g., a single cell corresponding to a single voxel) into four cells (e.g., four voxels) as shown in the act 566.

In addition, after splitting the cells to generate the children cells for the valid cells in act 560, the three-dimensional graphics modification system 106 can perform a melt brush operation (e.g., acts 552, 554, 556, and 558 in accordance with one or more embodiments herein) on the children cells to further refine the split voxels. In particular, the three-dimensional graphics modification system 106 can utilize the split operation in the act 560 to further refine the voxels during a digital melt brush operation. Additionally, the three-dimensional graphics modification system 106 can utilize valid cells that meet the desired voxel size without further splitting and/or tree adjustment. In some embodiments, the three-dimensional graphics modification system 106 does not perform another set of tree adjustments (e.g., splits and/or merges) for the children cells after modifying the split voxels (e.g., the children cells).

As shown in FIG. 5D, the three-dimensional graphics modification system 106 can render the resulting voxels in the act 566 after splitting and merging voxels in the tree adjustment act 560. Indeed, as shown in FIG. 5D, the three-dimensional graphics modification system 106 can render the octree having the updated cells based on the digital melt brush operation in the acts 552-560. As illustrated in FIG. 5D, the resulting voxels in the act 566 are smoothed (e.g., a melt effect) upon performing the one or more the acts 552-560 in accordance with one or more embodiments herein.

Although FIG. 5D illustrates splitting and/or merging voxels with regard to a smooth or melt effect, the three-dimensional graphics modification system 106 can also split and/or merge voxels in applying other digital brush tools. For example, as mentioned above, the three-dimensional graphics modification system 106 can also split and/or merge one or more voxels after applying a 3D blur brush tool and/or 3D smudge brush tool on the one or more voxels. This allows the three-dimensional graphics modification system 106 to maintain a desired level of detail while applying smudge or blur effects to three-dimensional representations.

Figure 5E:
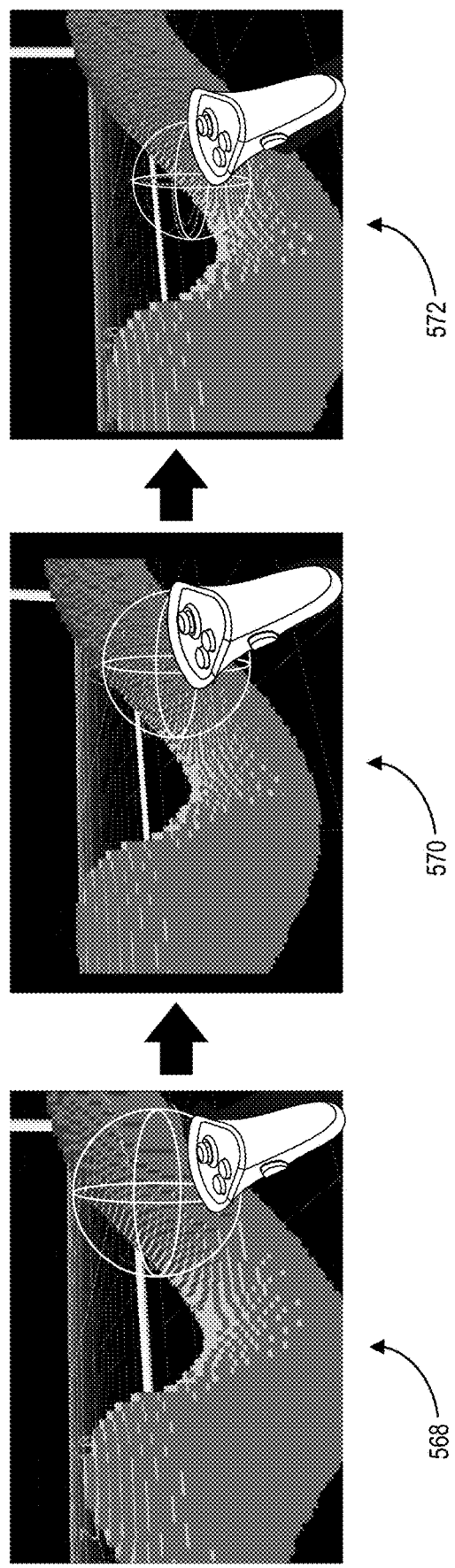
FIGS. 5E and 5F illustrate an example of applying a melt effect to one or more voxels in accordance with one or more embodiments.

Indeed, the three-dimensional graphics modification system 106 can perform the acts described above to provide a melt effect on a voxel-based 3D representation in response to an interaction with a 3D digital melt brush tool. As an example, FIG. 5E illustrates a 3D digital melt brush tool utilized within a virtual reality 3D painting space. In particular, as shown in FIG. 5E, the three-dimensional graphics modification system 106 can receive a 3D digital melt brush tool interaction with a voxel-based 3D representation in an act 568. Then, as shown in FIG. 5E, the three-dimensional graphics modification system 106 can modify intersecting voxels in accordance with one or more embodiments herein to smooth voxels belonging to the 3D representation in acts 570 and 572. Indeed, as illustrated in FIG. 5E, the three-dimensional graphics modification system 106 modifies the voxels to reduce the size of the voxels in order to render a smoothing effect (e.g., a melt effect) for the segment intersected by the 3D digital melt brush tool (e.g., from larger voxels in the act 568 to smaller voxels in the acts 570 and 572).

Figure 5F:
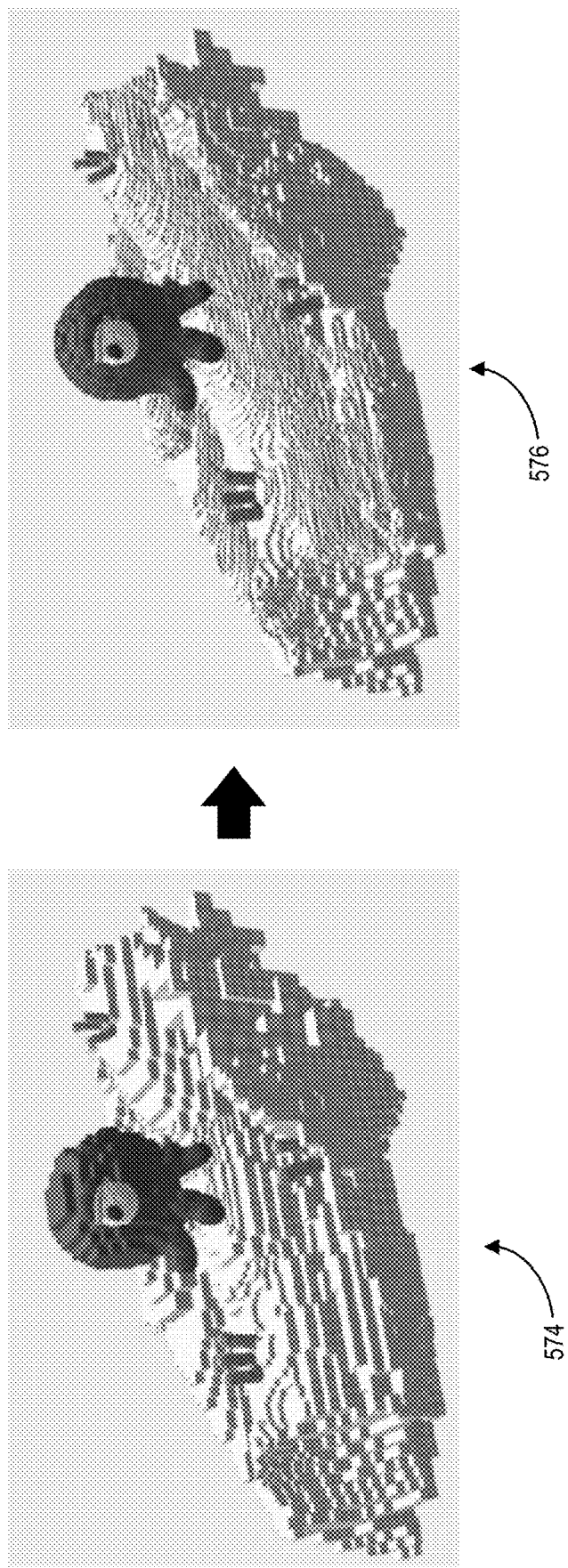

Moreover, FIG. 5F also illustrates an example voxel-based 3D representation modified by the three-dimensional graphics modification system 106 in accordance with one or more embodiments. In particular, as shown in FIG. 5F, the three-dimensional graphics modification system 106 receives multiple brush stroke interactions of a 3D digital melt brush tool to modify the voxel-based 3D representation 574. Indeed, as shown in FIG. 5F, by utilizing a melt brush tool, the three-dimensional graphics modification system 106 smooths one or more voxels of the voxel-based 3D representation 574 to render a smoothed, voxel-based 3D representation 576. Indeed, the three-dimensional graphics modification system 106 utilizes the melt brush tool to split one or more larger voxels (in accordance with one or more embodiments herein) from the voxel-based 3D representation 574 to render the smoothed, voxel-based 3D representation 576.

In one or more embodiments, the three-dimensional graphics modification system 106 modifies one or more voxels of a 3D-representation based on a 3D swell brush tool. In particular, the three-dimensional graphics modification system 106 can utilize maximum blending in each diffusion act (e.g., blend one or more voxels using the highest identified alpha value from the voxels) for a 3D swell brush tool. Furthermore, the three-dimensional graphics modification system 106 can utilize opposite conditions within an alpha validity test for a 3D swell brush tool. For example, the three-dimensional graphics modification system 106 can identify invalid cells using an alpha validity test (in accordance with one or more embodiments herein), split the invalid cell, and provide visual properties to the split invalid cells (e.g., rather than merge the invalid cells). Indeed, by doing so, the three-dimensional graphics modification system 106 can cause an increase in size for the one or more voxels (e.g., a swelling effect) rather than a melt effect.

Furthermore, the three-dimensional graphics modification system 106 can perform the one or more processes described above iteratively (e.g., one or more the processes described in FIGS. 4A-4D and FIGS. 5A-5F). For example, the three-dimensional graphics modification system 106 can iteratively perform the one or more processes described above during an active brush stroke and/or while a user provides multiple brush strokes using a 3D digital brush tool. For example, the three-dimensional graphics modification system 106 can update a first RGBA buffer, update a second RGBA buffer, update (or generate) an alpha buffer, perform diffusion processes at the second RGBA buffer, and/or select (or update) visual properties on a GPU-side octree and/or CPU-side octree iteratively as the three-dimensional graphics modification system 106 receives one or more additional voxels within segment information input (and/or one or more additional brush strokes).

As mentioned above, the three-dimensional graphics modification system 106 can utilize a mosaic filter to render voxels of a 3D representation at varying depths of an octree to provide varying levels of detail. In particular, in some embodiments, the three-dimensional graphics modification system 106 utilizes a target voxel size to identify voxels having a smaller size than the target voxel size within an octree. Furthermore, the three-dimensional graphics modification system 106 can iteratively merge the voxels having the size smaller than the target voxel size within the octree to be larger than or equal to the target voxel size. Moreover, the three-dimensional graphics modification system also provides a preview of the 3D representation based on the octree and the target voxel size. In addition, the three-dimensional graphics modification system 106 can save multiple, computationally expensive topological changes in the octree (e.g., to preserve details of a 3D-representation after applying a mosaic filter).

Figure 6A:
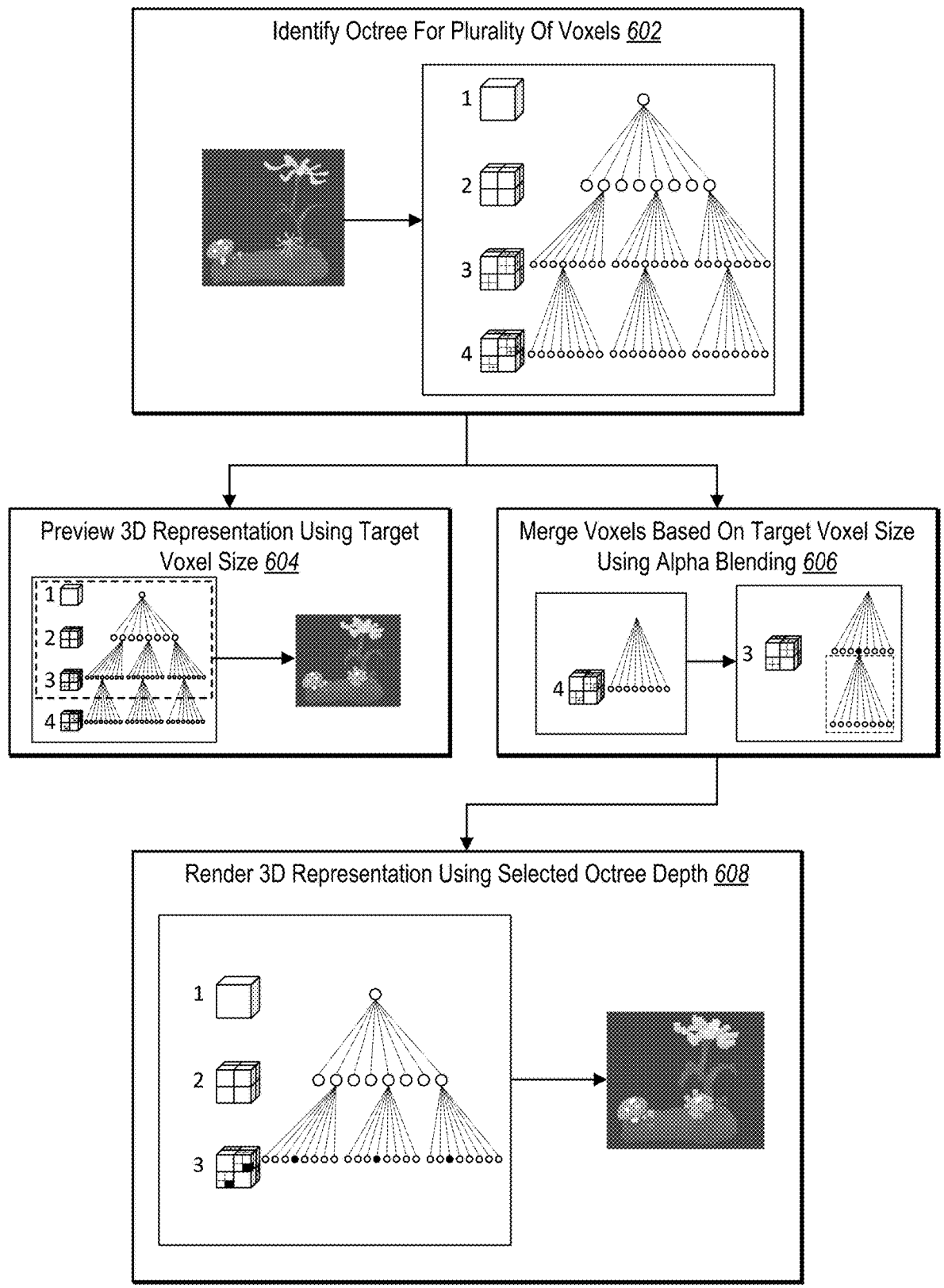
FIG. 6A illustrates a flowchart of a three-dimensional graphics modification system rendering voxels at varying depths of an octree to provide varying levels of detail based on a target voxel size in accordance with one or more embodiments.

For instance, FIG. 6A illustrates a flowchart of the three-dimensional graphics modification system 106 rendering voxels at varying depths of an octree in accordance with one or more embodiments. As shown in FIG. 6A, the three-dimensional graphics modification system 106 identifies an octree for a plurality of voxels in an act 602. Moreover, as shown in FIG. 6A, the three-dimensional graphics modification system 106 provides a preview rendering of the 3D representation using the selected target size (e.g., octree depth) in an act 604. Additionally, the three-dimensional graphics modification system 106 also merges voxels based on a target voxel size using alpha blending in an act 606. Then, the three-dimensional graphics modification system 106 renders the 3D representation using the selected octree depth (e.g., based on the target voxel size) in an act 608. Indeed, in some embodiments, the three-dimensional graphics modification system 106 can preview the 3D representation using the selected target size (e.g., in the act 604) and thereafter merge voxels based on the target voxel size (e.g., in the act 606) to render the 3D representation using the selected octree depth (e.g., in the act 608).

Indeed, as shown in FIG. 6A, the three-dimensional graphics modification system 106 performs the act 602 by identifying varying voxel sizes at different depths of the octree. For instance, octree depth 4 includes one or more voxels having a smaller voxel size than one or more voxels in depth 2. In response to identifying a target voxel size of depth 3, the three-dimensional graphics modification system 106 can merge the voxels at depth 4. Specifically, at the act 606, the three-dimensional graphics modification system 106 merges one or more voxels of depth 4 of the octree to match the target voxel size. Additionally, at the act 608, the three-dimensional graphics modification system 106 renders the merged voxels.

By rendering voxels at varying depths of an octree to provide varying levels of detail based on a target voxel size (e.g., a mosaic filter), the three-dimensional graphics modification system 106 can control the amount of memory consumption while rendering and/or modifying a voxel-based 3D representation. For instance, by merging one or more voxels based on a target voxel size, the three-dimensional graphics modification system 106 can render a voxel-based 3D representation with a selected amount of detail and, therefore, consume less memory (e.g., render a lesser number of voxels). In some embodiments, as described below, the three-dimensional graphics modification system 106 can use the mosaic filter tool on specific regions of a 3D-representation to reduce detail in certain areas while preserving details in other areas of the 3D-representation (e.g., to reduce memory consumption in areas of unwanted detail). Moreover, by saving multiple, expensive topological changes in the octree (e.g., at varying depths resulting from merging voxels based on various target voxel size), the three-dimensional graphics modification system 106 can preserve details when merge actions on voxels are not easily reversible.

Additionally, as previously mentioned, the three-dimensional graphics modification system 106 can efficiently modify voxels using one or more digital brush tools described above. For instance, the three-dimensional graphics modification system 106 can utilize a mosaic filter on a 3D representation having a dense number of voxels to reduce the number of voxels prior to applying a digital brush tool. Indeed, by reducing the number of voxels, the three-dimensional graphics modification system 106 can modify voxels more efficiently (e.g., by having a reduced resolution or number of voxels to modify). In one or more embodiments, the three-dimensional graphics modification system 106 applies and renders modifications corresponding to digital brush tools (e.g., the digital blur brush tool, digital smudge brush tool, and/or digital melt brush tool) with faster speeds by reducing the number of voxels based on a mosaic filter as described herein.

As previously mentioned, the three-dimensional graphics modification system 106 can utilize an octree having voxels (or visual properties of voxels) at varying voxel sizes. Indeed, in one or more embodiments, the three-dimensional graphics modification system 106 can render a voxel having a larger voxel size by rendering visual properties of the voxel in a larger space within a 3D space (e.g., a voxel size corresponds to the amount of space a voxel represents within a 3D space). Likewise, the three-dimensional graphics modification system 106 can render a voxel having a smaller voxel size by rendering visual properties of the voxel in a smaller space within the 3D space.

Moreover, the three-dimensional graphics modification system 106 can utilize an octree that represents various portions of space with a 3D space based on nodes of the octree. For instance, the three-dimensional graphics modification system 106 can utilize an octree that subdivides a 3D space into portions of eight octants using nodes (e.g., each cell or node represents a part of the 3D space) from the center of the 3D space. As an example, the three-dimensional graphics modification system 106 can render a 3D representation using an octree having eight cells (or nodes) in a first depth using eight voxels (e.g., a voxel per cell). Furthermore, the three-dimensional graphics modification system 106 can render an increasing number of cells as the octree increases in depth (or children nodes). For example, when each cell from the first depth has children cells in a second depth (e.g., 8 children cell per cell) the three-dimensional graphics modification system 106 can render the 3D representation using sixty-four voxels within the second depth in the octree (e.g., sixty-four subdivided voxels of a smaller size from the eight voxels in the first depth).

Indeed, the three-dimensional graphics modification system 106 can increase and/or reduce the number of voxels to render based on any depth of the octree. Furthermore, the three-dimensional graphics modification system 106 can utilize an octree that includes depths having nodes (or voxel details) for any number of nodes from a previous depth (e.g., each node of a previous depth has children nodes and/or only some nodes of the previous depth has children nodes). Moreover, although one or more embodiments herein describe the three-dimensional graphics modification system 106 using an octree having voxels of a smaller size as depth increases in the octree, the octree having voxels increasing in voxel size as the depth of the octree increases.

Furthermore, as mentioned above, the three-dimensional graphics modification system 106 can receive a target voxel size for the mosaic filter tool feature. For instance, in one or more embodiments, the three-dimensional graphics modification system 106 receives the target voxel size as user input in a mosaic filter tool interface and/or as a user interaction with a mosaic filter tool. For example, the three-dimensional graphics modification system 106 can receive a target voxel size for the mosaic filter tool feature based on user interactions and/or input such as, but not limited to, a selection from one or more target voxel size options in a user interface, a sliding bar corresponding to voxel detail (e.g., varying voxel sizes) in a user interface, scrolling action from a mouse, pinching and/or sliding in a touch screen, etc.

Additionally, upon receiving a target voxel size, the three-dimensional graphics modification system 106 identifies voxels in an octree that correspond to a size smaller than the target voxel size (e.g., by looping through voxels of belonging to the octree). For example, the three-dimensional graphics modification system 106 can identify an octree depth that corresponds to the target voxel size (e.g., a depth having voxels with a voxel size that matches and/or is nearest to the target voxel size). Then, the three-dimensional graphics modification system 106 can identify (and/or associate) voxels corresponding to a tree depth below (or above) the depth that corresponds to the target voxel size as voxels having a smaller voxel size compared to the target voxel size. In some embodiments, the three-dimensional graphics modification system 106 identifies voxels in an octree that meet the target voxel size (e.g., voxels that are the same size and smaller as the target voxel size) as the voxels to merge.

Indeed, the three-dimensional graphics modification system 106 can merge such voxels to reduce the amount of detail (and/or maximum voxel size) in a 3D-representation. For example, the three-dimensional graphics modification system 106 can merge one or more voxels belonging to a second depth of an octree (e.g., a second depth corresponding to a smaller voxel size) to generate a voxel for a first depth of the octree (e.g., a first depth corresponding to a larger voxel size). For instance, the three-dimensional graphics modification system 106 can merge one or more voxels that are identified to be smaller than a target voxel size and utilize the resulting voxel visual properties for the voxel corresponding to a parent cell in an octree (e.g., as a voxel corresponding to a depth above the depth of the one or more merged voxels).

Moreover, the three-dimensional graphics modification system 106 can merge voxels based on a blending mode. For example, the three-dimensional graphics modification system 106 can receive a blending mode selection to blend the one or more identified voxels for merging. In particular, the three-dimensional graphics modification system 106 can receive a blending mode from a user as a selection corresponding to a mosaic filter tool. For example, the three-dimensional graphics modification system 106 can provide blending mode options corresponding to alpha blending. For instance, the three-dimensional graphics modification system 106 can provide blending mode options such as, but not limited to, maximum alpha blending and/or average alpha blending. For instance, the three-dimensional graphics modification system 106 can perform maximum alpha blending and/or average alpha blending amongst a set of children nodes (or voxels) for a parent voxel to merge the children voxels. Indeed, the three-dimensional graphics modification system 106 can also provide blending mode options that utilize an average color of voxels and/or mix RGB values of the voxels while preserving alpha (e.g., in an RGBA based voxel).

Furthermore, the three-dimensional graphics modification system 106 can create one or more backups of an octree corresponding to a 3D representation while merging voxels in accordance with one or more embodiments herein. In particular, the three-dimensional graphics modification system 106 can save (or store) details corresponding to an octree at each depth of the octree when merging voxels (e.g., to reduce and/or bring back detail of a 3D representation based on varying depths of the octree). By doing so, the three-dimensional graphics modification system 106 can reduce memory consumption by rendering based on a desired level of detail while storing details of varying levels in storage.

Additionally, the three-dimensional graphics modification system 106 can render the 3D representation using the one or more varying levels of detail on an octree. In particular, based on a target voxel size, the three-dimensional graphics modification system 106 can render the 3D representation using an octree by traversing to a depth with voxels corresponding to the target voxel size and smaller voxels merged to be within the same octree depth. Indeed, when an additional target voxel size is received, the three-dimensional graphics modification system 106 can iteratively identify an additional depth within the octree corresponding to the voxel size and merge voxels that are smaller than the additional target voxel size to render the 3D representation according to the additional target voxel size (in accordance with one or more embodiments herein).

Moreover, while receiving a target voxel size, the three-dimensional graphics modification system 106 can also render a preview of a 3D representation based on a selected target voxel size before finalizing the target voxel size (e.g., as shown in the act 604 of FIG. 6A). For example, the three-dimensional graphics modification system 106 can change the maximum traversal level of an octree based on a target voxel size (e.g., to a corresponding depth) while preserving each depth of the octree (e.g., mipmapping various levels of detail corresponding to the octree) on a GPU-side octree. In particular, the three-dimensional graphics modification system 106 can render voxels belonging to an octree at a traversal level corresponding to a selected target voxel size in a mosaic feature tool while disregarding octree depths that correspond to a smaller size (e.g., while a user slides a selecting bar and/or provides a scroll input to change size). In some embodiments, the three-dimensional graphics modification system 106 renders the 3D representation at a selected traversal level (e.g., based on a selected target voxel size) without merging smaller voxels within the octree as a preview. Indeed, once a target voxel size is finalized, the three-dimensional graphics modification system 106 merges smaller voxels within the octree to apply the mosaic filter effect to voxels in accordance with one or more embodiments herein.

Furthermore, in some embodiments, the three-dimensional graphics modification system 106 receives a request to increase a level of detail for a 3D representation (e.g., restore detail from a previous reduction in detail and/or size of voxels). In particular, the three-dimensional graphics modification system 106 can receive target voxel size that corresponds to a larger voxel size compared to the maximum voxel size being rendered. Upon receiving such a target voxel size, the three-dimensional graphics modification system 106 can utilize a stored octree having a tree depth corresponding to the target voxel size to render the 3D representation (e.g., a stored octree that includes a depth that was previously merged using one or more embodiments herein). Indeed, by doing so, the three-dimensional graphics modification system 106 can restore a level of detail (e.g., restore smaller voxels) belonging to an octree depth that corresponds to the larger target voxel size.

Additionally, the three-dimensional graphics modification system 106 can render voxels at varying depths of an octree to provide varying levels of detail based on a target voxel size (e.g., a mosaic filter) for specific regions of a voxel-based 3D representation. In particular, the three-dimensional graphics modification system 106 can receive a selection of a region corresponding to a 3D representation (e.g., a select portion of the 3D representation). Then, the three-dimensional graphics modification system 106 can identify voxels within an octree that correspond to the region of the 3D representation and apply a mosaic filter to the specific region in accordance with one or more embodiments herein. In particular, by doing so, the three-dimensional graphics modification system 106 can preserve smaller voxels (e.g., more detail) in some areas of a 3D representation while reducing smaller voxels (e.g., less detail) in other areas of the 3D representation in accordance with one or more embodiments herein.

Indeed, the three-dimensional graphics modification system 106 can utilize a mosaic filter feature (in accordance with one or more embodiments herein) to selectively increase and/or decrease a level of detail associated with a 3D representation (e.g., by changing a target voxel size). As an example, FIG. 6B illustrates the three-dimensional graphics modification system 106 rendering a 3D representation at varying levels of detail based on receiving different target voxel size inputs for a mosaic filter tool.

Figure 6B:
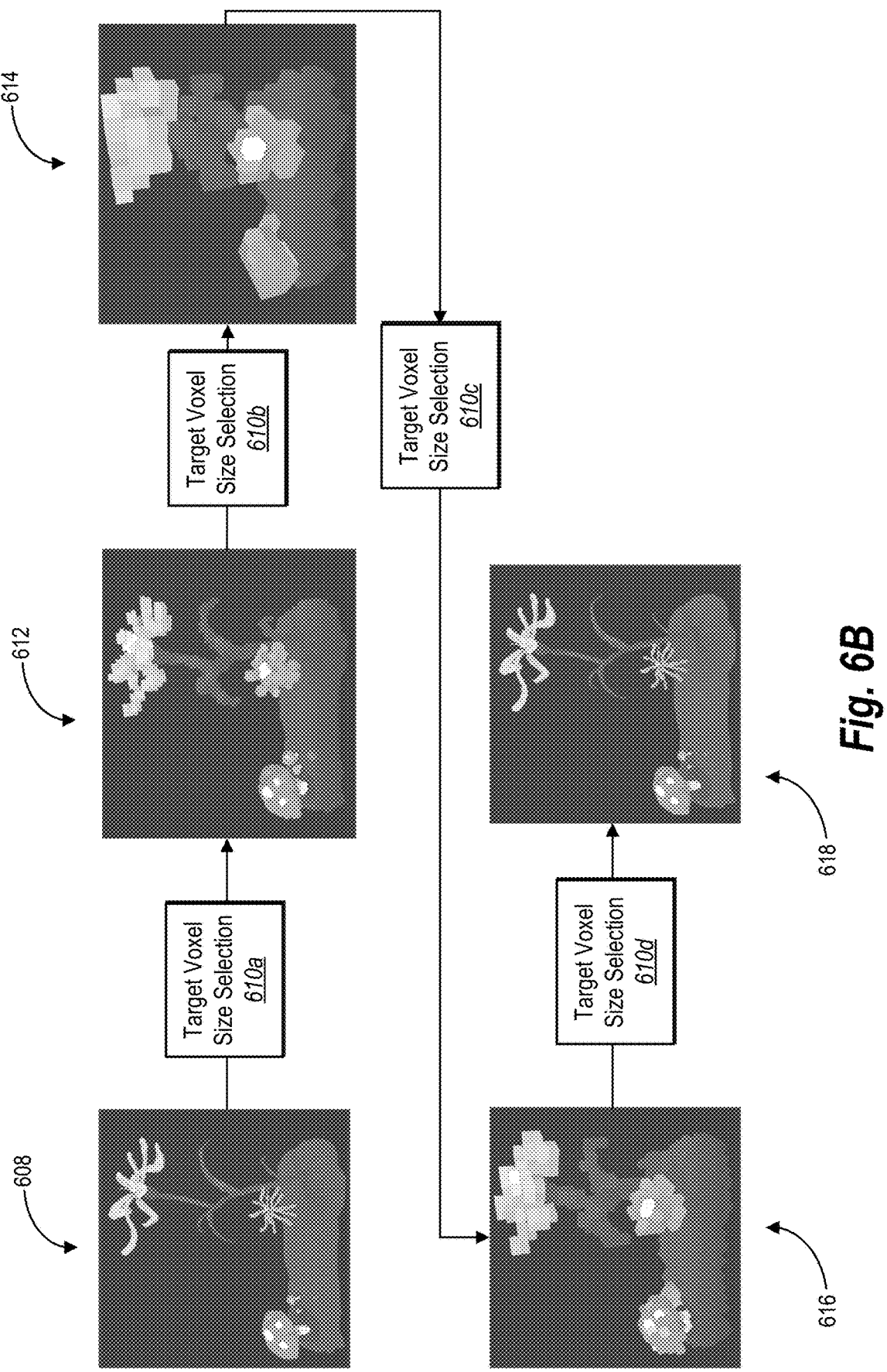
FIG. 6B illustrates a three-dimensional graphics modification system rendering a 3D representation at varying levels of detail based on receiving different target voxel size inputs in accordance with one or more embodiments.

For instance, as shown in FIG. 6B, the three-dimensional graphics modification system 106 can receive a target voxel size selection 610a for a first 3D representation 608 and can render the first 3D representation 608 using the target voxel size selection 610a as a second 3D representation 612 (e.g., having less voxel detail based on a mosaic filter in accordance with one or more embodiments herein). Furthermore, as illustrated in FIG. 6B, the three-dimensional graphics modification system 106 can further reduce detail of the second 3D representation 612 upon receiving a target voxel size selection 610b to render a third 3D representation 614 (e.g., having even less detail).

Then, as shown in FIG. 6B, the three-dimensional graphics modification system 106 can increase detail of the third 3D representation 614 upon receiving a target voxel size selection 610c to render a fourth 3D representation 616. Furthermore, as shown in FIG. 6B, the three-dimensional graphics modification system 106 can further increase detail of the fourth 3D representation 616 upon receiving a target voxel size selection 610d to render a fifth 3D representation 618. Indeed, by utilizing the mosaic feature, the three-dimensional graphics modification system 106 can enable a 3D representation to have a reduction of memory while preserving a similar appearance with simple user interactions (e.g., intuitively and with less time).

Figure 7:
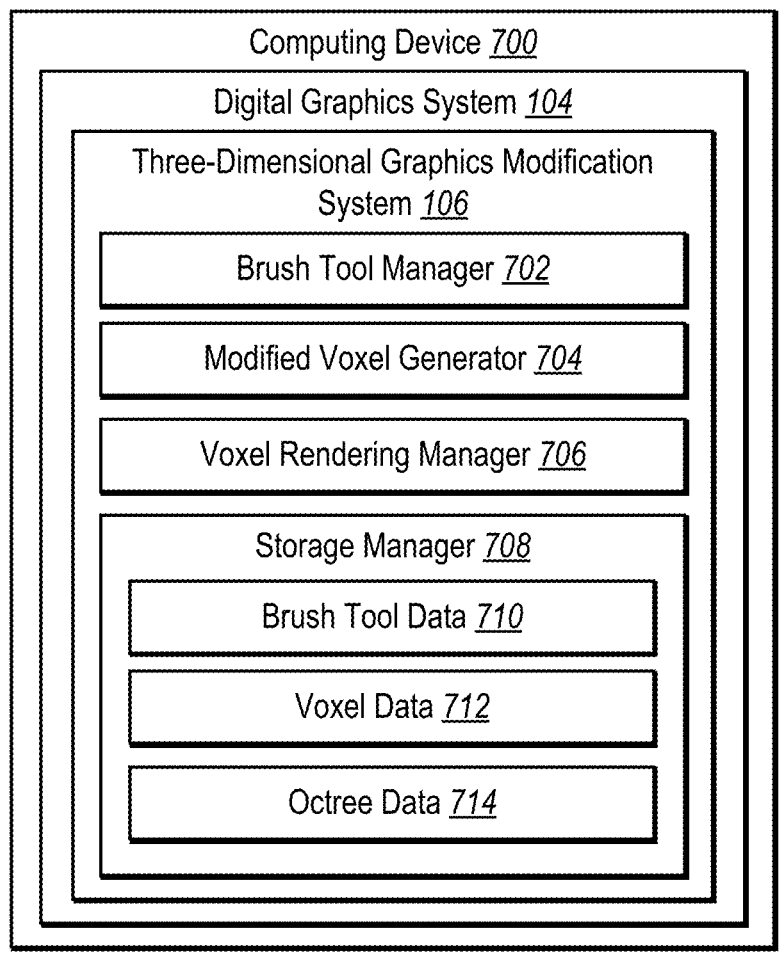
FIG. 7 illustrates a schematic diagram of a three-dimensional graphics modification system in accordance with one or more embodiments.

Turning now to FIG. 7, additional detail will be provided regarding components and capabilities of one embodiments of the three-dimensional graphics modification system. In particular, FIG. 7 illustrates an embodiment of an example three-dimensional graphics modification system 106 executed by a computing device 700 (e.g., the server device(s) 102 and/or the client device 110). As shown by the embodiment in FIG. 7, the computing device 700 can include or host the digital graphics system 104 and the three-dimensional graphics modification system 106. The three-dimensional graphics modification system 106 can include a brush tool manager 702, a modified voxel generator 704, a voxel rendering manager 706, and a storage manager 708 which can include brush tool data 710, voxel data 712, and octree data 714.

As just mentioned, and as illustrated in the embodiment in FIG. 7, the three-dimensional graphics modification system 106 can include the brush tool manager 702. For example, the brush tool manager 702 can detect user interactions, select one or more voxels, receive one or more modification modes (e.g., blur, smudge, melt, mosaic effects) as described above (e.g., in relation to FIGS. 3, 4A-4D, 5A-5F, and 6A-6B). Furthermore, the brush tool manager can present (or display) one or more digital brush tools in a 3D painting space (e.g., a VR painting space) to select and/or modify one or more voxels of a 3D representation as described above (e.g., in relation to FIG. 3).

Furthermore, as shown in FIG. 7, the three-dimensional graphics modification system 106 can include the modified voxel generator 704. For instance, the modified voxel generator 704 can utilize one or more received inputs from a 3D digital brush tool to modify one or more voxels to have a blur effect, smudge effect, and/or melt effect as described above (e.g., in relation to FIGS. 4A-4D and 5A-5F). In particular, the modified voxel generator 704 can utilize one or more buffers, diffusion acts, and/or alpha validity tests to modify one or more voxels to have a blur effect, smudge effect, and/or melt effect as described above (e.g., in relation to FIGS. 4A-4D and 5A-5F). Additionally, the modified voxel generator 704 can utilize one or more octrees, target voxel sizes, and/or blending modes to apply a mosaic effect on one or more voxels to reduce and/or increase details on a 3D representation as described above (e.g., in relation to FIGS. 6A-6B).

In addition, as shown in FIG. 7, the three-dimensional graphics modification system 106 can include the voxel rendering manager 706. For example, the voxel rendering manager 706 can render and/or display one or more voxels of a 3D representation within a 3D space as described above (e.g., in relation to FIGS. 4A-4D and 6A-6B). In particular, the voxel rendering manager 706 can render and/or display one or more voxels having visual properties that are modified by one or more digital brush tools (e.g., a blur, smudge, and/or melt brush) and/or with varying sizes (e.g., a mosaic effect) as described above (e.g., in relation to FIGS. 4A-4D and 6A-6B).

Furthermore, as illustrated in FIG. 7, the three-dimensional graphics modification system 106 can include the storage manager 708. In some embodiments, the storage manager 708 can be implemented by one or more memory devices. The storage manager 708 can maintain data to perform one or more functions of the three-dimensional graphics modification system 106. As shown in FIG. 7, the storage manager 708 can include the brush tool data 710 (e.g., a digital brush tool mode such as blur, smudge, and/or melt, a digital brush tool size, a digital brush tool interaction, and/or input segment data such as intersecting voxels), the voxel data 712 (e.g., voxels of a 3D representation, intersecting voxels, modified voxels, visual properties such as RGBA values, voxel size data, and/or 3D representation data), and/or the octree data 714 (e.g., cells corresponding to voxels, tree depths, and/or depths corresponding to merged voxels).

Each of the components 702-714 of the computing device 700 (e.g., the computing device 700 implementing the three-dimensional graphics modification system 106), as shown in FIG. 7, may be in communication with one another using any suitable communication technologies. It will be recognized that although components 702-714 of the computing device 700 are shown to be separate in FIG. 7, any of components 702-714 may be combined into fewer components, such as into a single facility or module, divided into more components, or configured into different components as may serve a particular embodiment.

The components 702-714 of the computing device 700 can comprise software, hardware, or both. For example, the components 702-714 can comprise one or more instructions stored on a computer-readable storage medium and executable by processors of one or more computing devices. When executed by the one or more processors, the computer-executable instructions of the three-dimensional graphics modification system 106 (e.g., via the computing device 700) can cause a client device and/or a server device to perform the methods described herein. Alternatively, the components 702-714 and their corresponding elements can comprise hardware, such as a special purpose processing device to perform a certain function or group of functions. Additionally, the components 702-714 can comprise a combination of computer-executable instructions and hardware.

Furthermore, the components 702-714 of the three-dimensional graphics modification system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-714 may be implemented as a stand-alone application, such as a desktop or mobile application. Furthermore, the components 702-714 may be implemented as one or more web-based applications hosted on a remote server. The components 702-714 may also be implemented in a suite of mobile device applications or "apps." To illustrate, the components 702-714 may be implemented in an application, including but not limited to, ADOBE PHOTOSHOP, ADOBE ILLUSTRATOR, or ADOBE SUBSTANCE. "ADOBE," "ADOBE PHOTO SHOP," "ADOBE ILLUSTRATOR," or "ADOBE SUBSTANCE" are either registered trademarks or trademarks of Adobe Inc. in the United States and/or other countries.

Figure 8:
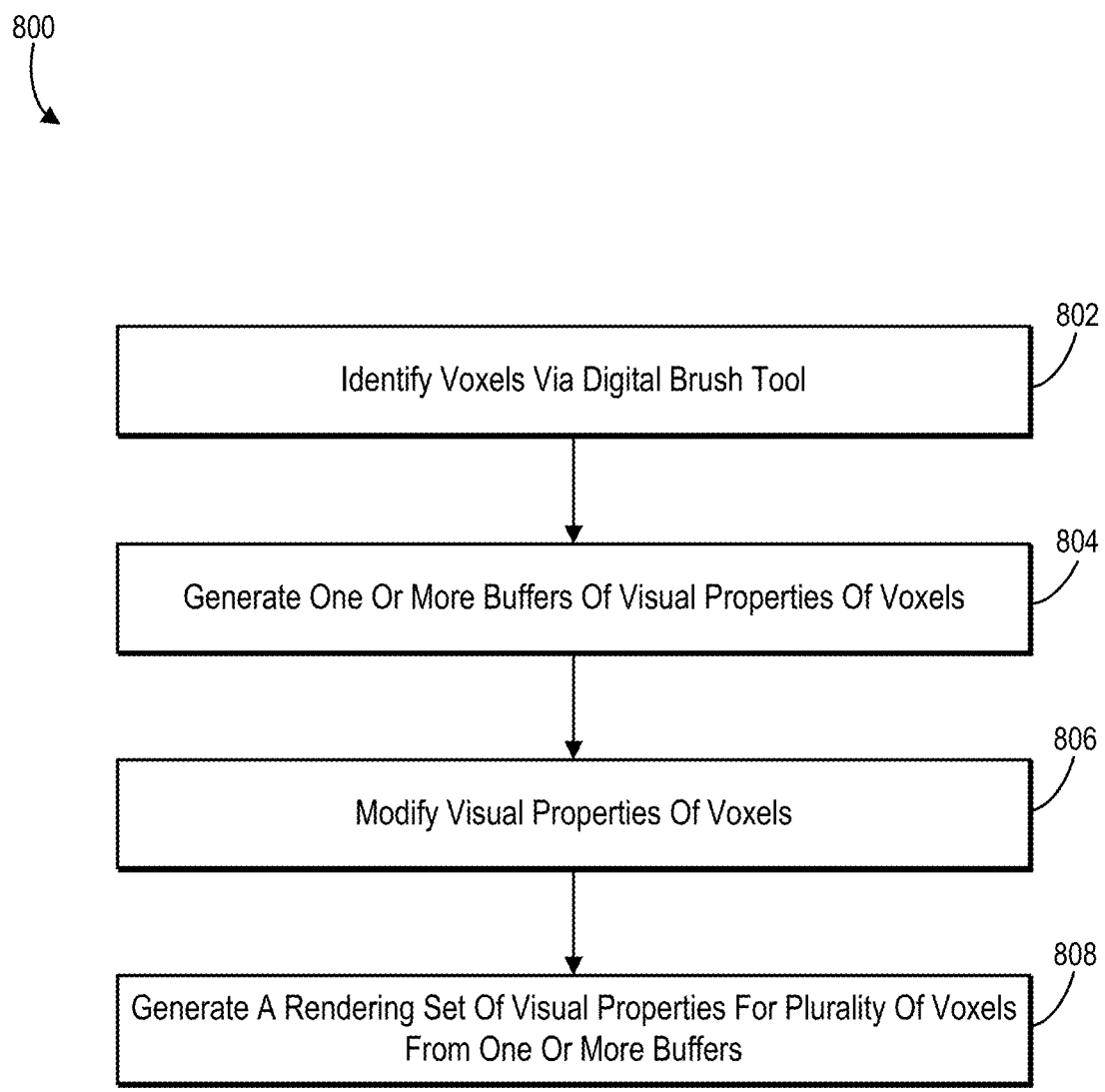
FIG. 8 illustrates a flowchart of a series of acts for modifying one or more voxels based on a 3D digital brush tool in accordance with one or more embodiments.
Figure 9:
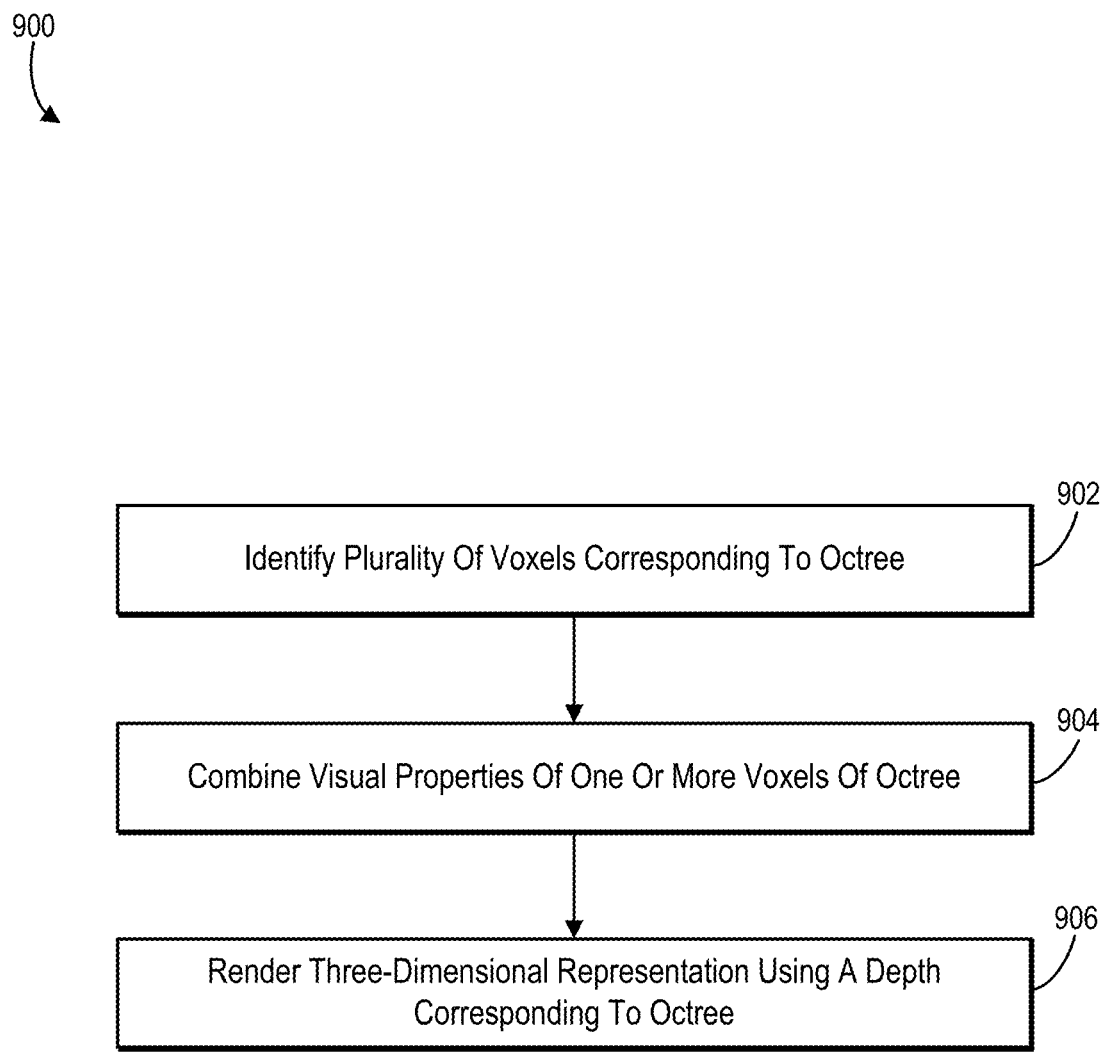
FIG. 9 illustrates a flowchart of a series of acts for modifying one or more voxels by rendering an octree based on a target voxel size in accordance with one or more embodiments.

FIGS. 1-7, the corresponding text, and the examples provide a number of different methods, systems, devices, and non-transitory computer-readable media of the three-dimensional graphics modification system 106. In addition to the foregoing, one or more embodiments can also be described in terms of flowcharts comprising acts for accomplishing a particular result, as shown in FIGS. 8 and 9. FIGS. 8 and 9 may be performed with more or fewer acts. Further, the acts may be performed in differing orders. Additionally, the acts described herein may be repeated or performed in parallel with one another or parallel with different instances of the same or similar acts.

As mentioned above, FIG. 8 illustrates a flowchart of a series of acts 800 for modifying one or more voxels based on a 3D digital brush tool in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As illustrated in FIG. 8, the series of acts 800 include an act 802 of identifying voxels via a digital brush tool. In particular, the act 802 can include identifying, via a user interaction with a digital brush tool, a selection of a plurality of voxels from a three-dimensional representation. For example, a digital brush tool can include a blur brush tool, a smudge brush tool, or a smooth brush tool. Furthermore, the act 802 can include identifying neighboring voxels for a voxel from the plurality of voxels by determining a set of six neighboring voxels adjacent to the voxel (e.g., identified via a digital brush tool). Moreover, the act 802 can include identifying neighboring voxels by identifying six voxels adjacent to a voxel. Additionally, the act 802 can include neighboring voxels for a voxel from a plurality of voxels by determining a subset of neighboring voxels adjacent the voxel based on a direction of travel corresponding to a user interaction with a smudge brush tool. Furthermore, the act 802 can include identifying neighboring voxels by identifying less than six voxels adjacent to a voxel based on a direction of travel corresponding to a user interaction with a digital smudge brush tool.

As illustrated in FIG. 8, the series of acts 800 include an act 804 of generating one or more buffers of visual properties of voxels. In particular, the act 804 can include generating a first buffer of visual properties of a plurality of voxels. For instance, a first buffer of visual properties can include colors and opacities of a plurality of voxels. Furthermore, the act 804 can include generating a second buffer of visual properties having modified colors and modified opacities (of a plurality of voxels). For instance, the act 804 can include generating a second buffer of visual properties having modified colors and modified opacities by modifying colors and opacities of a plurality of voxels based on neighboring voxels within a three-dimensional representation. Furthermore, the act 804 can include generating a second buffer of visual properties having modified colors and modified opacities by identifying neighboring voxels for a voxel of a plurality of voxels within a three-dimensional representation and diffusing (within the second buffer) visual properties of neighboring voxels from a first buffer.

For example, modified colors and modified opacities of a second buffer can include diffused visual properties. Furthermore, the act 804 can include determining diffused visual properties based on colors and opacities of a plurality of voxels from a first buffer and neighboring colors and neighboring opacities of the neighboring voxels. Moreover, the act 804 can include generating a third buffer of visual properties of a plurality of voxels. For instance, a third buffer can include opacities of a plurality of voxels (and/or colors of a plurality of voxels).

As illustrated in FIG. 8, the series of acts 800 include an act 806 of modifying visual properties of voxels. In particular, the act 806 can include modifying visual properties of a plurality of voxels reflected in a first buffer based on visual properties from a second buffer. Furthermore, the act 806 can include modifying colors of a plurality of voxels reflected in a first buffer based on modified colors from a second buffer. Moreover, the act 806 can include modifying a three-dimensional representation using a digital brush tool by comparing modified opacities from a second buffer to a threshold opacity. For instance, a threshold opacity can be zero.

Furthermore, the act 806 can include modifying a three-dimensional representation using a blur brush and/or a smudge brush by determining diffused visual properties. For example, the act 806 can include determining diffused visual properties based on colors and opacities of a plurality of voxels from a first buffer and/or neighboring colors and neighboring opacities of a neighboring voxel (and/or neighboring voxels). For example, modified colors and modified opacities of a second buffer can include diffused visual properties. Additionally, the act 806 can include modifying a three-dimensional representing using a blur brush and/or a smudge brush by identifying neighboring voxels by determining one or more sets of neighboring voxels adjacent to one or more voxels from a plurality of voxels. Moreover, the act 806 can include modifying a three-dimensional representation using a smudge brush by determining one or more sets of neighboring voxels adjacent to one or more voxels from a plurality of voxels in a direction of travel corresponding to a user interaction with a digital brush tool. For instance, the act 806 can include applying a digital brush tool to a plurality of voxels of a three-dimensional representation to modify the three-dimensional representation using a blur brush, a smudge brush, and/or a smoothing brush (e.g., a melt brush).

Additionally, the act 806 can include modifying visual properties of a rendering set of visual properties based on opacities from a third buffer. For example, the act 806 can include modifying visual properties of a rendering set of visual properties by modifying opacities corresponding to the rendering set of visual properties based on a comparison between opacities from a third buffer to the opacities corresponding to the rendering set of visual properties (and/or a first buffer). Furthermore, the act 806 can include modifying a three-dimensional representation using a smooth brush by modifying colors of a plurality of voxels reflected in a first buffer based on a comparison of opacities from the first buffer to opacities of a third buffer.

In addition, the act 806 can include modifying colors of a plurality of voxels reflected in a first buffer by determining an alpha validity threshold for a voxel based on an opacity for a voxel from a third buffer and deleting a color from the voxel reflected in the first buffer upon determining that an opacity corresponding to the color of the voxel in the first buffer is less than the alpha validity threshold. Additionally, the act 806 can include modifying colors of a plurality of voxels reflected in a first buffer by restoring an alpha value from a plurality of voxels reflected in a third buffer when an opacity corresponding to a color of a voxel meets an alpha validity threshold. Furthermore, the act 806 can include modifying a three-dimensional representation using a smooth brush by merging two or more voxels from a plurality of voxels based on rendering colors of the two or more voxels and/or splitting one or more additional voxels based on rendering colors of the one or more additional voxels.

As illustrated in FIG. 8, the series of acts 800 include an act 808 of generating a rendering set of visual properties for a plurality of voxels from one or more buffers. In particular, the act 808 can include generating a rendering set of visual properties for a plurality of voxels from a first buffer and a second buffer based on modified opacities of the second buffer. Furthermore, the act 808 can include generating a rendering set of visual properties for a plurality of voxels by selecting rendering colors from colors from a first buffer and modified colors from a second buffer (e.g., to generate the rendering set of visual properties) based on comparing modified opacities (e.g., from the second buffer) to a threshold opacity. Moreover, the act 808 can include generating a rendering set of visual properties for a plurality of voxels by comparing modified opacities from a second buffer to a threshold opacity and selecting rendering colors based on comparing the modified opacities to the threshold opacity.

Additionally, the act 808 can include generating a rendering set of visual properties based on opacities from a third buffer. Moreover, the act 808 can include generating a rendering set of visual properties by generating opacities corresponding to the rendering set of visual properties based on a comparison between the opacities from a third buffer and opacities from a first buffer. In addition, the act 808 can include rendering a three-dimensional representation using a rendering set of visual properties for a plurality of voxels.

As mentioned above, FIG. 9 illustrates a flowchart of a series of acts 900 for modifying one or more voxels by rendering an octree based on a target voxel size in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As illustrated in FIG. 9, the series of acts 900 includes an act 902 of identifying a plurality of voxels corresponding to an octree. In particular, the act 902 can include identifying a plurality of voxels from a three-dimensional representation having voxels. For example, a plurality of voxels can correspond to an octree. Moreover, as an example, an octree can include one or more depths of visual properties for voxels within a plurality of voxels. For instance, one or more depths can correspond to one or more voxel sizes. Furthermore, the act 902 can include identifying a first depth of visual properties of an octree based on a target voxel size. Additionally, the act 902 can include determining one or more voxels at a second depth of visual properties within an octree. For instance, a second depth can correspond to a smaller voxel size than a target voxel size. Additionally, the act 902 can include receiving, via a user interaction, a request to set a maximum octree depth of a three-dimensional representation to a second depth.

As illustrated in FIG. 9, the series of acts 900 includes an act 904 of combining visual properties of one or more voxels of an octree. In particular, the act 904 includes combining visual properties of one or more voxels corresponding to a second depth of visual properties of an octree. Additionally, the act 904 can include combining visual properties of one or more voxels corresponding to a second depth of visual properties of an octree by using a blending mode to merge the one or more voxels.

As illustrated in FIG. 9, the series of acts 900 includes an act 906 of rendering a three-dimensional representation using a depth corresponding to an octree. In particular, the act 906 can include rendering a three-dimensional representation using a first depth of visual properties of an octree and combined visual properties of one or more voxels corresponding to a second depth of visual properties. Furthermore, the act 906 can include, based on a user interaction, accessing a second depth of visual properties of an octree to render a three-dimensional representation using visual properties of at least one or more voxels corresponding to the second depth of visual properties.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
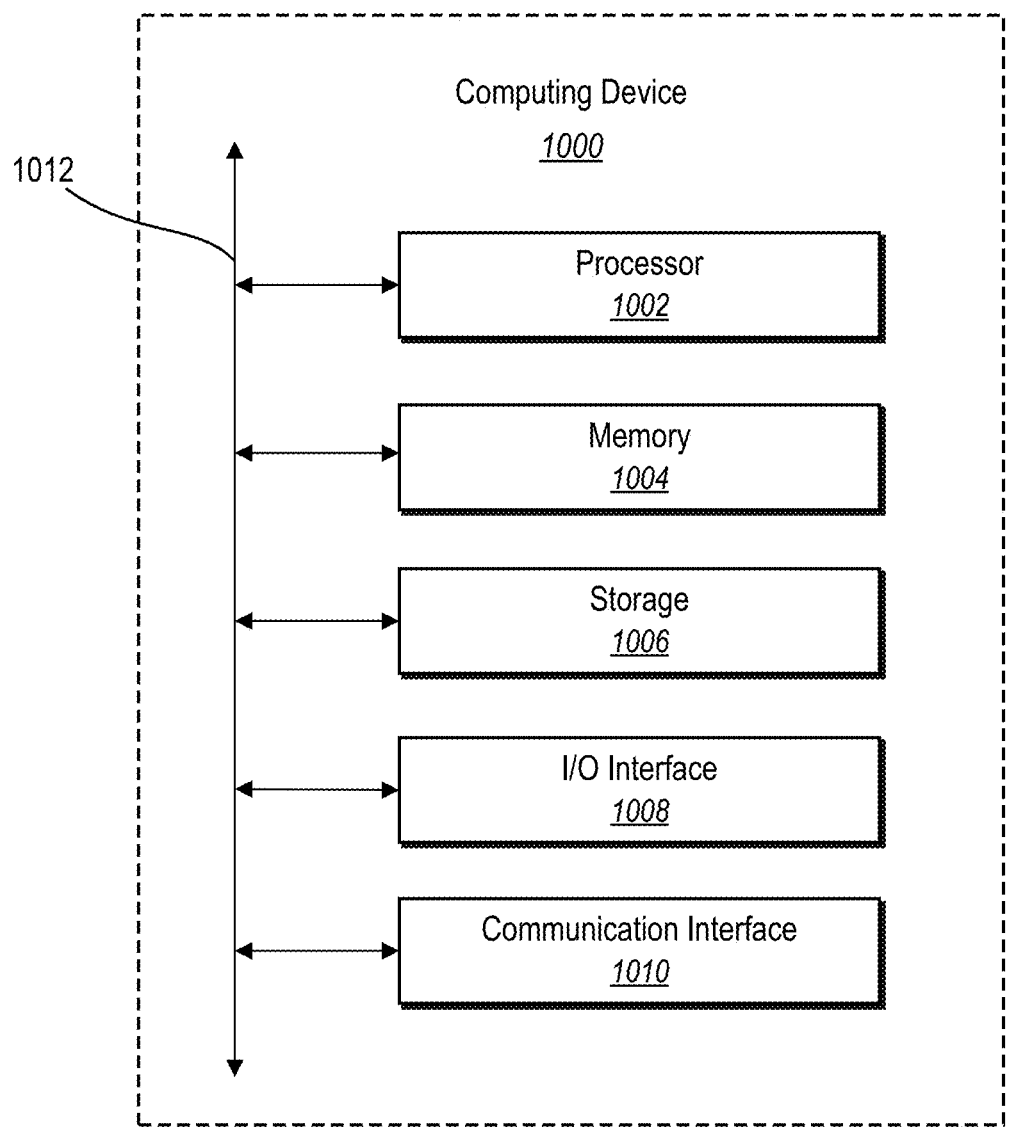
FIG. 10 illustrates a block diagram of an example computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 700, server device(s) 102, and client device 110). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting.

Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer device to:
   identify, via a digital brush tool, a selection of a plurality of voxels from a three-dimensional representation;
   generate a first buffer of visual properties comprising colors and opacities of the plurality of voxels;
   generate a second buffer of visual properties comprising modified colors and modified opacities by:
      copying the colors and the opacities reflected in the first buffer to the second buffer to generate colors and opacities in the second buffer; and
      diffusing the colors and the opacities of a particular voxel in the second buffer utilizing visual properties of neighboring voxels reflected in the first buffer for the particular voxel in the second buffer;
   modify visual properties of one or more voxels from the plurality of voxels reflected in the first buffer utilizing modified colors and modified opacities in the second buffer; and
   generate a rendering set of visual properties for the plurality of voxels from the first buffer and the second buffer based on the modified opacities of the second buffer.

2. The non-transitory computer-readable medium of claim 1,
   wherein the digital brush tool comprises at least one of a blur brush tool, a smudge brush tool, or a smooth brush tool, and
   further storing instructions that, when executed by the at least one processor, cause the computer device to modify the three-dimensional representation using the digital brush tool by:
      comparing the modified opacities from the second buffer to a threshold opacity; and
      wherein generating the rendering set of visual properties for the plurality of voxels comprises selecting rendering colors from the first buffer and the second buffer based on comparing the modified opacities to the threshold opacity.

3. The non-transitory computer-readable medium of claim 2, further storing instructions that, when executed by the at least one processor, cause the computer device to modify the three-dimensional representation using the digital brush tool by:

determining diffused visual properties based on:
the colors and the opacities of the plurality of voxels from the first buffer; and
neighboring colors and neighboring opacities of the neighboring voxels; and
wherein the modified colors and modified opacities of the second buffer comprise the diffused visual properties.

4. The non-transitory computer-readable medium of claim 3,
wherein the threshold opacity is zero and the digital brush tool comprises a blur brush tool, and
further storing instructions that, when executed by the at least one processor, cause the computer device to identify the neighboring voxels for the particular voxel from the plurality of voxels by determining a set of six neighboring voxels adjacent to the particular voxel.

5. The non-transitory computer-readable medium of claim 3, wherein the digital brush tool comprises a smudge brush tool and further storing instructions that, when executed by the at least one processor, cause the computer device to identify the neighboring voxels for the particular voxel from the plurality of voxels by determining a subset of neighboring voxels adjacent to the particular voxel based on a direction of travel corresponding to the smudge brush tool.

6. The non-transitory computer-readable medium of claim 1, wherein the digital brush tool comprises a smooth brush tool and further storing instructions that, when executed by the at least one processor, cause the computer device to modify the three-dimensional representation by:
generating a third buffer of visual properties of the plurality of voxels, wherein the third buffer comprises the opacities of the plurality of voxels; and
generating the rendering set of visual properties based on the opacities from the third buffer.

7. The non-transitory computer-readable medium of claim 6, wherein generating the rendering set of visual properties comprises generating opacities corresponding to the rendering set of visual properties based on a comparison between the opacities from the third buffer and opacities from the first buffer by comparing an opacity corresponding to a voxel in the first buffer to an alpha validity threshold for the voxel based on an opacity corresponding to the voxel in the third buffer.

8. The non-transitory computer-readable medium of claim 6, further storing instructions that, when executed by the at least one processor, cause the computer device to modify the three-dimensional representation using the smooth brush tool by modifying the colors reflected in the first buffer based on a comparison of the opacities from the first buffer to the opacities from the third buffer by comparing an opacity corresponding to a voxel in the first buffer to an alpha validity threshold for the voxel based on an opacity corresponding to the voxel in the third buffer.

9. The non-transitory computer-readable medium of claim 8, wherein modifying the colors reflected in the first buffer comprises deleting a color for the voxel reflected in the first buffer upon determining that the opacity corresponding to the color of the voxel in the first buffer is less than the alpha validity threshold.

10. The non-transitory computer-readable medium of claim 9, further storing instructions that, when executed by the at least one processor, cause the computer device to modify the three-dimensional representation using the smooth brush tool by:
merging two or more voxels from the plurality of voxels based on the two or more voxels comprising no visual properties; and
splitting one or more additional voxels based on the one or more additional voxels comprising visual properties.

11. A system comprising:
one or more memory devices comprising a three-dimensional representation comprising voxels; and
one or more computing devices that cause the system to apply a digital brush tool to a plurality of voxels of the three-dimensional representation by:
generating a first buffer of visual properties comprising colors and opacities of the plurality of voxels;
generating a second buffer of visual properties comprising modified colors and modified opacities by:
copying the colors and the opacities reflected in the first buffer to the second buffer to generate colors and opacities in the second buffer;
identifying neighboring voxels from the first buffer for a particular voxel of the plurality of voxels from the second buffer; and
diffusing, within the second buffer, visual properties of the particular voxel in the second buffer utilizing visual properties of the neighboring voxels reflected in the first buffer for the particular voxel in the second buffer;
modifying the colors of one or more voxels from the plurality of voxels reflected in the first buffer utilizing the modified colors corresponding to one or more voxels reflected in the second buffer; and
generating a rendering set of visual properties for the plurality of voxels by:
comparing the modified opacities from the second buffer to a threshold opacity; and
selecting rendering colors based on comparing the modified opacities to the threshold opacity.

12. The system of claim 11, wherein
the threshold opacity is zero,
the digital brush tool comprises a blur brush tool, and
identifying the neighboring voxels comprises identifying six voxels adjacent to the particular voxel.

13. The system of claim 11, wherein
the digital brush tool comprises a smudge brush tool, and
identifying the neighboring voxels comprises identifying less than six voxels adjacent to the particular voxel based on a direction of travel corresponding to a user interaction with the smudge brush tool.

14. The system of claim 11, wherein the digital brush tool comprises a smooth brush tool and the one or more computing devices further cause the system to apply the smooth brush tool to the plurality of voxels of the three-dimensional representation to modify the three-dimensional representation by:
generating a third buffer of visual properties of the plurality of voxels, wherein the third buffer comprises the opacities of the plurality of voxels; and
generating the rendering set of visual properties based on the opacities from the third buffer.

15. The system of claim 14, wherein the one or more computing devices further cause the system to modify the three-dimensional representation using the smooth brush tool by modifying the colors reflected in the first buffer based on a comparison of the opacities from the first buffer to the opacities from the third buffer by comparing an opacity corresponding to a voxel in the first buffer to an alpha validity threshold for the voxel based on an opacity corresponding to the voxel in the third buffer.

16. The system of claim 15, wherein modifying the colors reflected in the first buffer comprises deleting a color for the voxel reflected in the first buffer upon determining that the opacity corresponding to the color of the voxel in the first buffer is less than the alpha validity threshold.

17. The system of claim 11, wherein the one or more computing devices further cause the system to apply the digital brush tool to the plurality of voxels of the three-dimensional representation by rendering the three-dimensional representation using the rendering set of visual properties for the plurality of voxels.

18. A computer-implemented method comprising:
identifying, via a digital smooth brush tool within a virtual reality environment, a selection of a plurality of voxels from a three-dimensional representation;
generating a first buffer of visual properties comprising colors and opacities of the plurality of voxels;
generating a second buffer of visual properties comprising modified colors and modified opacities by:
copying the colors and the opacities reflected in the first buffer to the second buffer to generate colors and opacities in the second buffer; and
diffusing the colors and the opacities in the second buffer utilizing visual properties of neighboring voxels reflected in the first buffer;
generating a third buffer of visual properties comprising opacities of the plurality of voxels;
modifying visual properties of one or more voxels from the plurality of voxels reflected in the first buffer utilizing modified colors and modified opacities in the second buffer; and
modifying the three-dimensional representation by generating a rendering set of visual properties for the plurality of voxels from the first buffer, the second buffer, and the third buffer based on a comparison between the opacities from the third buffer and opacities from the first buffer by comparing an opacity corresponding to a voxel in the first buffer to an alpha validity threshold for the voxel based on an opacity corresponding to the voxel in the third buffer.

19. The computer-implemented method of claim 18, further comprising modifying the three-dimensional representation using the digital smooth brush tool modifying the colors reflected in the first buffer based on the comparison of the opacities from the first buffer to the opacities from the third buffer by comparing the opacity corresponding to the voxel in the first buffer to the alpha validity threshold for the voxel based on the opacity corresponding to the voxel in the third buffer.

20. The computer-implemented method of claim 19, further comprising displaying, within the virtual reality environment, the three-dimensional representation comprising the rendering set of visual properties while actively receiving a selection of additional voxels for modification within the first buffer and the second buffer via the digital smooth brush tool.

* * * * *